(12) United States Patent
Craddock et al.

(10) Patent No.: US 8,615,645 B2
(45) Date of Patent: Dec. 24, 2013

(54) CONTROLLING THE SELECTIVELY SETTING OF OPERATIONAL PARAMETERS FOR AN ADAPTER

(75) Inventors: David Craddock, New Paltz, NY (US); Mark S. Farrell, Pleasant Valley, NY (US); Beth A. Glendening, Poughkeepsie, NY (US); Thomas A. Gregg, Highland, NY (US); Dan F. Greiner, San Jose, CA (US); Gustav E. Sittmann, III, Webster Groves, MO (US); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/821,181

(22) Filed: Jun. 23, 2010

(65) Prior Publication Data

US 2011/0320772 A1    Dec. 29, 2011

(51) Int. Cl.
  *G06F 15/00*    (2006.01)
(52) U.S. Cl.
  USPC ......................................................... 712/220
(58) Field of Classification Search
  None
  See application file for complete search history.

(56) References Cited

U.S. PATENT DOCUMENTS

| | | | |
|---|---|---|---|
| 4,028,668 A | 6/1977 | Riikonen | |
| 4,271,468 A | 6/1981 | Christensen et al. | |
| 4,323,963 A | 4/1982 | Wu | |
| 5,053,952 A | * 10/1991 | Koopman et al. | 712/248 |
| 5,170,472 A | 12/1992 | Cwiakala et al. | |
| 5,265,240 A | 11/1993 | Galbraith et al. | |
| 5,282,274 A | 1/1994 | Liu | |
| 5,430,856 A | 7/1995 | Kinoshita | |
| 5,465,332 A | 11/1995 | Deloye et al. | |
| 5,465,355 A | 11/1995 | Cook et al. | |
| 5,535,352 A | 7/1996 | Bridges et al. | |
| 5,551,013 A | 8/1996 | Beausoleil et al. | |
| 5,574,873 A | 11/1996 | Davidian | |
| 5,586,268 A | 12/1996 | Chen et al. | |
| 5,600,805 A | 2/1997 | Fredericks et al. | |
| 5,617,554 A | 4/1997 | Alpert et al. | |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

Office Action for U.S. Appl. No. 12/821,174 dated Jan. 19, 2012.

(Continued)

*Primary Examiner* — Andrew Caldwell
*Assistant Examiner* — William B Partridge
(74) *Attorney, Agent, or Firm* — John E. Campbell; Blanche E. Schiller, Esq.; Heslin Rothenberg Farley & Mesiti P.C.

(57) ABSTRACT

An instruction is provided to establish various operational parameters for an adapter. These parameters include adapter interruption parameters, input/output address translation parameters, resetting error indications, setting measurement parameters, and setting an interception control, as examples. The instruction specifies a function information block, which is a program representation of a device table entry used by the adapter, to be used in certain situations in establishing the parameters. A store instruction is also provided that stores the current contents of the function information block.

21 Claims, 28 Drawing Sheets

(56) References Cited

U.S. PATENT DOCUMENTS

| | | |
|---|---|---|
| 5,742,785 A | 4/1998 | Stone et al. |
| 5,761,448 A | 6/1998 | Adamson et al. |
| 5,790,825 A | 8/1998 | Traut |
| 5,802,590 A | 9/1998 | Draves |
| 5,819,053 A | 10/1998 | Goodrum et al. |
| 5,822,616 A | 10/1998 | Hirooka |
| 5,826,084 A | 10/1998 | Brooks et al. |
| 5,838,960 A | 11/1998 | Harriman, Jr. |
| 5,870,598 A | 2/1999 | White et al. |
| 5,875,343 A | 2/1999 | Binford et al. |
| 5,875,463 A | 2/1999 | Crump et al. |
| 5,901,312 A | 5/1999 | Radko |
| 5,960,213 A | 9/1999 | Wilson |
| 5,974,440 A | 10/1999 | Brooks et al. |
| 5,995,745 A | 11/1999 | Yodaiken |
| 6,009,261 A | 12/1999 | Scalzi et al. |
| 6,023,736 A | 2/2000 | Lambeth et al. |
| 6,067,595 A | 5/2000 | Lindenstruth |
| 6,078,970 A | 6/2000 | Nordstrom et al. |
| 6,205,530 B1 | 3/2001 | Kang |
| 6,308,255 B1 | 10/2001 | Gorishek, IV et al. |
| 6,330,647 B1 | 12/2001 | Jeddeloh et al. |
| 6,330,656 B1 | 12/2001 | Bealkowski et al. |
| 6,349,380 B1 | 2/2002 | Shahidzadeh et al. |
| 6,397,350 B1 | 5/2002 | Baskey et al. |
| 6,408,347 B1 | 6/2002 | Smith et al. |
| 6,463,582 B1 | 10/2002 | Lethin et al. |
| 6,493,741 B1 | 12/2002 | Emer et al. |
| 6,519,645 B2 | 2/2003 | Markos et al. |
| 6,529,978 B1 | 3/2003 | Eide et al. |
| 6,557,035 B1 | 4/2003 | McKnight |
| 6,578,191 B1 | 6/2003 | Boehme et al. |
| 6,581,130 B1 | 6/2003 | Brinkmann, Jr. et al. |
| 6,615,305 B1 | 9/2003 | Olesen et al. |
| 6,629,175 B1 | 9/2003 | Manning et al. |
| 6,654,818 B1 | 11/2003 | Thurber |
| 6,658,521 B1 | 12/2003 | Biran et al. |
| 6,658,599 B1 | 12/2003 | Linam et al. |
| 6,704,831 B1 | 3/2004 | Avery |
| 6,715,011 B1 | 3/2004 | Buckland et al. |
| 6,721,839 B1 | 4/2004 | Bauman et al. |
| 6,751,752 B1 | 6/2004 | Smith |
| 6,772,097 B1 | 8/2004 | Kromenaker et al. |
| 6,772,264 B1 | 8/2004 | Dayan et al. |
| 6,792,492 B1 | 9/2004 | Griffin |
| 6,820,164 B2 | 11/2004 | Holm et al. |
| 6,901,537 B2 | 5/2005 | Dawkins et al. |
| 6,907,510 B2 | 6/2005 | Bennett et al. |
| 6,963,940 B1 | 11/2005 | Glassen et al. |
| 6,968,446 B1 | 11/2005 | McGrath |
| 6,970,992 B2 | 11/2005 | Gurumoorthy et al. |
| 6,978,338 B2 | 12/2005 | Wang et al. |
| 6,996,638 B2 | 2/2006 | Brice, Jr. et al. |
| 7,065,598 B2 | 6/2006 | Connor et al. |
| 7,107,384 B1 | 9/2006 | Chen et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,209,994 B1 | 4/2007 | Klaiber et al. |
| 7,225,287 B2 | 5/2007 | Wooten |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,328,296 B1 | 2/2008 | Marmash et al. |
| 7,334,107 B2 | 2/2008 | Schoinas et al. |
| 7,340,582 B2 | 3/2008 | Madukkarumukumana |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,454,548 B2 | 11/2008 | Belmar et al. |
| 7,464,191 B2 | 12/2008 | Arndt et al. |
| 7,464,209 B2 | 12/2008 | Armstrong et al. |
| 7,475,183 B2 | 1/2009 | Traut et al. |
| 7,493,425 B2 | 2/2009 | Arndt et al. |
| 7,496,706 B2 | 2/2009 | Nguyen et al. |
| 7,496,707 B2 | 2/2009 | Freking et al. |
| 7,502,872 B2 | 3/2009 | Boyd et al. |
| 7,506,087 B2 | 3/2009 | Ho et al. |
| 7,509,391 B1 | 3/2009 | Chauvel et al. |
| 7,516,252 B2 | 4/2009 | Krithivas |
| 7,526,592 B2 | 4/2009 | Tsuruta |
| 7,529,860 B2 | 5/2009 | Freimuth et al. |
| 7,530,071 B2 | 5/2009 | Billau et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,567,567 B2 | 7/2009 | Muller et al. |
| 7,587,531 B2 | 9/2009 | Brice, Jr. et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,623,460 B2 | 11/2009 | Miyazaki |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,886,086 B2 | 2/2011 | Sharma et al. |
| 8,112,556 B2 | 2/2012 | Hanson et al. |
| 8,504,754 B2 | 8/2013 | Craddock et al. |
| 8,505,032 B2 | 8/2013 | Craddock et al. |
| 2001/0021971 A1 | 9/2001 | Gibson et al. |
| 2002/0152334 A1 | 10/2002 | Holm et al. |
| 2002/0161907 A1 | 10/2002 | Moon |
| 2003/0056155 A1 | 3/2003 | Austen et al. |
| 2003/0074541 A1 | 4/2003 | Plambeck |
| 2004/0015622 A1 | 1/2004 | Avery |
| 2004/0025166 A1 | 2/2004 | Adlung et al. |
| 2004/0049600 A1 | 3/2004 | Boyd et al. |
| 2004/0064618 A1 | 4/2004 | Farrell et al. |
| 2004/0073905 A1 | 4/2004 | Emer et al. |
| 2004/0093452 A1 | 5/2004 | Easton et al. |
| 2004/0117534 A1 | 6/2004 | Parry et al. |
| 2004/0139304 A1 | 7/2004 | Arimilli et al. |
| 2004/0199700 A1 | 10/2004 | Clayton |
| 2004/0236880 A1 | 11/2004 | Barrett |
| 2005/0033895 A1 | 2/2005 | Lueck et al. |
| 2005/0071472 A1 | 3/2005 | Arndt et al. |
| 2005/0114586 A1 | 5/2005 | Brice, Jr. et al. |
| 2005/0114623 A1 | 5/2005 | Craddock et al. |
| 2005/0257100 A1 | 11/2005 | Anglin et al. |
| 2005/0289271 A1 | 12/2005 | Martinez et al. |
| 2006/0005083 A1 | 1/2006 | Genden et al. |
| 2006/0064618 A1 | 3/2006 | Wu et al. |
| 2006/0101181 A1 | 5/2006 | Post et al. |
| 2006/0130071 A1 | 6/2006 | Martin et al. |
| 2006/0195617 A1 | 8/2006 | Arndt et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0281630 A1 | 12/2006 | Bailey et al. |
| 2006/0288130 A1 | 12/2006 | Madukkarumukumana |
| 2007/0028087 A1 | 2/2007 | Yu et al. |
| 2007/0073955 A1 | 3/2007 | Murray et al. |
| 2007/0097871 A1 | 5/2007 | Boyd et al. |
| 2007/0136554 A1 | 6/2007 | Biran et al. |
| 2007/0168636 A1 | 7/2007 | Hummel et al. |
| 2007/0168643 A1 | 7/2007 | Hummel et al. |
| 2007/0168644 A1 | 7/2007 | Hummel et al. |
| 2007/0168934 A1* | 7/2007 | Chandrasekharan et al. ... 717/106 |
| 2007/0174723 A1 | 7/2007 | Cardona et al. |
| 2007/0186074 A1 | 8/2007 | Bradford et al. |
| 2007/0226386 A1 | 9/2007 | Sharp et al. |
| 2007/0234018 A1 | 10/2007 | Feiste |
| 2007/0245041 A1 | 10/2007 | Hua et al. |

(56) References Cited

U.S. PATENT DOCUMENTS

| | | |
|---|---|---|
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0098197 A1 | 4/2008 | Craddock et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2008/0263391 A1 | 10/2008 | Blinick et al. |
| 2008/0270853 A1 | 10/2008 | Chagoly et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0276775 A1 | 11/2009 | Brown et al. |
| 2009/0328035 A1 | 12/2009 | Ganguly |
| 2010/0005234 A1 | 1/2010 | Ganga et al. |
| 2010/0082855 A1 | 4/2010 | Accapadi et al. |
| 2010/0169528 A1 | 7/2010 | Kumar et al. |
| 2011/0099289 A1 | 4/2011 | Poggesi et al. |
| 2011/0138219 A1 | 6/2011 | Walton et al. |
| 2011/0153893 A1 | 6/2011 | Foong et al. |
| 2011/0202748 A1 | 8/2011 | Jacobi et al. |
| 2011/0314260 A1 | 12/2011 | Greiner et al. |
| 2011/0314263 A1 | 12/2011 | Greiner et al. |
| 2011/0320637 A1 | 12/2011 | Coneski et al. |
| 2011/0320638 A1 | 12/2011 | Coneski et al. |
| 2011/0320643 A1 | 12/2011 | Brice et al. |
| 2011/0320644 A1 | 12/2011 | Craddock et al. |
| 2011/0320652 A1 | 12/2011 | Craddock et al. |
| 2011/0320653 A1 | 12/2011 | Gregg et al. |
| 2011/0320662 A1 | 12/2011 | Craddock et al. |
| 2011/0320663 A1 | 12/2011 | Brice et al. |
| 2011/0320664 A1 | 12/2011 | Belmar et al. |
| 2011/0320666 A1 | 12/2011 | Gregg et al. |
| 2011/0320670 A1 | 12/2011 | Bayer et al. |
| 2011/0320674 A1 | 12/2011 | Gregg et al. |
| 2011/0320675 A1 | 12/2011 | Gregg et al. |
| 2011/0320703 A1 | 12/2011 | Craddock et al. |
| 2011/0320756 A1 | 12/2011 | Craddock et al. |
| 2011/0320757 A1 | 12/2011 | Craddock et al. |
| 2011/0320758 A1 | 12/2011 | Craddock et al. |
| 2011/0320759 A1 | 12/2011 | Craddock et al. |
| 2011/0320764 A1 | 12/2011 | Craddock et al. |
| 2011/0320773 A1 | 12/2011 | Craddock et al. |
| 2011/0320825 A1 | 12/2011 | Greiner et al. |
| 2011/0320860 A1 | 12/2011 | Coneski et al. |
| 2011/0320861 A1 | 12/2011 | Bayer et al. |
| 2011/0320887 A1 | 12/2011 | Craddock et al. |
| 2011/0320892 A1 | 12/2011 | Check et al. |
| 2011/0321060 A1 | 12/2011 | Craddock et al. |
| 2011/0321061 A1 | 12/2011 | Craddock et al. |
| 2011/0321158 A1 | 12/2011 | Craddock et al. |
| 2012/0239973 A1 | 9/2012 | Walton et al. |

FOREIGN PATENT DOCUMENTS

| | | |
|---|---|---|
| EP | 0902355 A2 | 3/1999 |
| EP | 0955585 A2 | 11/1999 |
| EP | 1096376 A2 | 2/2001 |
| EP | 1489491 A1 | 12/2004 |
| JP | 57191826 A | 11/1982 |
| JP | 359081724 A | 5/1984 |
| JP | 362079557 A | 4/1987 |
| JP | 405053973 A | 3/1993 |
| JP | 510996 A | 4/1993 |
| WO | WO9600940 A1 | 6/1995 |
| WO | WO9938074 A1 | 7/1999 |
| WO | WO 02/41157 A2 | 5/2002 |

OTHER PUBLICATIONS

"PCI Local Bus Specification Revision 3.0," Aug. 12, 2002, pp. 39, 44, 48, 49 and 58.

"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.

"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_access_under_32-Bit_PM_DOS>.

Device Identification Strings from OSR online; [online], internet archive date Mar. 13, 2005; retrieved May 26, 2012, 3 pages <URL:http://www.osronline.com/ddkx/install/idstrings_8tt3.htm>.

"IBM System/390 I/O Call Reporting Process," IBM Technical Disclosure Bulletin, vol. 36, No. 1, Jan. 1993, pp. 164-169, XP000222812.

"Means for Channel Subsystem-Initiated Communication," IBM Technical Disclosure Bulletin, vol. 33, No. 12, May 1991, p. 169, XP000121623.

Paulsen, Eric; "Local Memory Coaxes Top Speed from SCSI Masters," Electronic Design, v. 41, Apr. 15, 1993, pp. 76-6+.

Talluri et al., "A New Page Table for 64-bit Address Spaces," ACM SIGOPS Operating Systems Review, vol. 29, Issue 5 (Dec. 1995), pp. 194-200.

Crawford, Catherine H. et al., "Accelerating Computing with the Cell Broadband Engine Processor," May 2008, CF '08, May 5-7, 2008, Ischia, Italy, pp. 3-11.

Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.

Swift, Michael M. et al., "Improving the Reliability of Commodity Operating Systems," ACM Transactions on Computer Systems, vol. 23, No. 1, Feb. 2005, pp. 77-110.

Xu, Min et al., "Towards a VMM-based Usage Control Framework for OS Kernel Integrity Protection," SACMAT '07, Jun. 20-22, 2007, Sophia Antipolis, France, pp. 71-80.

Huang, Wei et al., "A Case for High Performance Computing with Virtual Machines," ISC '06, Jun. 3, 28 , 30, Carins, Queensland, Australia, pp. 125-134, Jun. 3, 2006.

Mysore, Shashidhar et al., "Understanding and Visualizing Full Systems with Data Flow Tomography," SPOLOS '08, Mar. 1-5, 2008, Seattle, Washington, USA, pp. 211-221.

"DMA Engines Bring Multicast to PCI Express Systems," http://electronicdesign.com, Aug. 13, 2009, 3 pages.

"Xen Wiki," http://wiki.xensource.com/xenwiki/VTdHowTo, 5 pages, Apr. 16, 2010.

Vaidyanathan, K., et al., "Exploiting RDMA Operations for Providing Efficient Fine-Grained Resource Monitoring in Cluster-based Servers," 1-4244-0328—Jun. 2006, 10 pages.

"IBM Enhances the IBM eServer zSeries 990 Family of Servers," Hardware Announcement, Oct. 7, 2003, pp. 1-11.

"I/O Virtualization and AMD's IOMMU," AMD Developer Central, http://developer.amd.com/documentation/articles/pages/892006101.aspx, Aug. 9, 2006.

(56) References Cited

OTHER PUBLICATIONS

"z/Architecture Principles of Operation," Chapter 17, pp. 17-1-17-30, IBM Publication No. SA22-7832-07, Feb. 2009.
"Chapter 6: Configuration Space" in PCI-SIG: "PCI Local Bus Specification Revision 3.0", Feb. 2004, pp. 213-254.
Hennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
"Decreased Latency Across PCI Express With I/O Virtualization Via a Hint Interface," IPCOM000185226D, Jul. 16, 2009, pp. 1-2.
Kamil et al., "Discussion #8 Topics: Paging, Multilevel Paging," Mar. 2004, pp. 1-3.
Ganapathy, Narayanan; "General Purpose Operating System Support for Multiple Page Sizes," USENIX Annual Technical Conference (No. 98), Jun. 1998, pp. 91-104.
"Large Page Support in the Linux Kernel," http://lwn.net/Articles/6969/ <retrieved on Jan. 26, 2010>, p. 1.
"Intel® Virtualization Technology for Directed I/O," Intel® Technology Journal, vol. 10, Issue 3, Aug. 10, 2006, pp. 1-16.
"z/Architecture Principles of Operation," IBM Publication No. SA22-7832-07, Feb. 2009, pp. 1-1344.
"z/VM: Running Guest Operating Systems," IBM Publication No. SC24-5997-02, Oct. 2001, pp. 1-179.
"z/VM: General Information Manual," IBM Publication No. GC24-5991-05, May 2003, pp. 1-131.
Winwood, Simon, et al., "Multiple Page Size Support in the Linux Kernel", Proceedings of Ottawa Linux Symposium, 2002 (no further date information available), pp. 1-21.
"Intel® Itanium® Architecture Software Developer's Manual," vol. 2, Rev. 2.2, Jan. 2006, pp. 1-653.
International Search Report and Written Opinion for PCT/EP2010/067039 dated Feb. 25, 2011, pp. 1-12.
International Search Report and Written Opinion for PCT/EP2010/067036 dated Feb. 14, 2011, pp. 1-11.
International Search Report and Written Opinion for PCT/EP2010/067030 dated Feb. 7, 2011, pp. 1-13.
International Search Report and Written Opinion for PCT/EP2010/067020 dated Apr. 5, 2011, pp. 1-10.
International Search Report and Written Opinion for PCT/EP2010/067025 dated Apr. 13, 2011, pp. 1-11.
International Search Report and Written Opinion for PCT/EP2010/067024 dated Apr. 27, 2011, pp. 1-9.
International Search Report and Written Opinion for PCT/EP2010/067019 dated Apr. 26, 2011, pp. 1-8.
International Search Report and Written Opinion for PCT/EP2010/067021 dated Apr. 28, 2011, pp. 1-8.
International Search Report and Written Opinion for PCT/EP2010/067043 dated Apr. 21, 2011, pp. 1-9.
International Search Report and Written Opinion for PCT/EP2010/067041 dated Apr. 26, 2011, pp. 1-8.
International Search Report and Written Opinion for PCT/EP2010/067031 dated Apr. 26, 2011, pp. 1-8.
International Search Report and Written Opinion for PCT/EP2010/067034 dated May 18, 2011, pp. 1-8.
International Search Report and Written Opinion for PCT/EP2010/067023 dated Jun. 15, 2011, pp. 1-12.
International Search Report and Written Opinion for PCT/EP2010/067032 dated May 27, 2011, pp. 1-10.
International Search Report and Written Opinion for PCT/EP2010/067038 dated Jun. 15, 2011pp. 1-10.
Gehringer, E. F., et al., "Virtual Memory Systems," CSC-506—Architecture of Parallel Computers Computer Science Department, College of Engineering, North Carolina, Dec. 31, 1999, XP002631523, pp. 1-8.
McGee, H.T., "Technique for Resetting a Single Channel Path Under Operator Control in IBM System/370XA," IBM Technical Disclosure Bulletin, vol. 26, No. 10B, Mar. 1984, pp. 1.
Office Action for U.S. Appl. No. 12/821,171 dated Oct. 7, 2011, pp. 1-22.
Office Action for U.S. Appl. No. 12/821,182 dated Oct. 13, 2011, pp. 1-20.
Office Action for U.S. Appl. No. 12/821,184 dated Oct. 18, 2011, pp. 1-35.
Office Action for U.S. Appl. No. 12/821,185 dated Dec. 20, 2011, pp. 1-29.
Office Action for U.S. Appl. No. 12/821,174 dated Jan. 19, 2012, pp. 1-37.
Final Office Action for U.S. Appl. No. 12/821,184 dated Jan. 24, 2012, pp. 1-16.
Office Action for U.S. Appl. No. 12/821,193 dated Feb. 24, 2012, pp. 1-45.
Office Action for U.S. Appl. No. 12/821,187 dated Feb. 28, 2012, pp. 1-39.
Final Office Action for U.S. Appl. No. 12/821,171 dated Mar. 29, 2012, pp. 1-9.
Office Action for U.S. Appl. No. 12/821,179 dated Apr. 24, 2012, pp. 1-27.
Office Action for U.S. Appl. No. 12/821,177 dated May 2, 2012. pp. 1-25.
Final Office Action for U.S. Appl. No. 12/821,185 dated Jun. 6, 2012. pp. 1-56.
Office Action for U.S. Appl. No. 12/821,190 dated Jun. 12, 2012, pp. 1-27.
Office Action for U.S. Appl. No. 12/821,174 dated Jun. 15, 2012, pp. 1-28.
International Search Report and Written Opinion for PCT/EP2010/067035 dated Mar. 8, 2011, pp. 1-10.
Final Office Action for U.S. Appl. No. 12/821,187 dated Jul. 16, 2012, pp. 1-24.
Office Action for U.S. Appl. No. 12/821,178 dated Jul. 16, 2012, pp. 1-28.
Office Action for U.S. Appl. No. 12/821,191 dated Jul. 18, 2012, pp. 1-32.
Office Action for U.S. Appl. No. 12/821,171 dated Jul. 19, 2012, pp. 1-18.
Office Action for U.S. Appl. No. 13/462,152 dated Aug. 28, 2012, pp. 1-28.
Office Action for U.S. Appl. No. 12/821,175 dated Sep. 17, 2012, pp. 1-41.
Office Action for U.S. Appl. No. 12/821,192 dated Oct. 11, 2012, pp. 1-29.
International Search Report and Written Opinion for PCT/EP2010/067029 dated Mar. 2, 2011, pp. 1-12.
International Search Report and Written Opinion for PCT/EP2010/067028 dated Mar. 8, 2011, pp. 1-10.
International Search Report and Written Opinion for PCT/EP2010/067042 dated Apr. 28, 2011, pp. 1-11.
Communication Pursuant to Article 94(3) EPC for Application No. 10 776 350.0-2212 dated Oct. 31, 2012, pp. 1-6.
Final Office Action for U.S. Appl. No. 12/821,174 dated Nov. 13, 2012, pp. 1-29.
Office Action for U.S. Appl. No. 12/821,170 dated Feb. 1, 2013, pp. 1-28.
Office Action for U.S. Appl. No. 13/672,028 dated Feb. 1, 2013, pp. 1-20.
Communication Pursuant to Article 94(3) EPC for Application No. 10 784 272.6-1243 dated Feb. 6, 2013, pp. 1-7.
Final Office Action for U.S. Appl. No. 12/821,171 dated Mar. 18, 2013, pp. 1-11.

(56) References Cited

OTHER PUBLICATIONS

Notice of Allowance for U.S. Appl. No. 12/821,172 dated Apr. 30, 2013, pp. 1-30.
Communication Pursuant to Article 94(3) EPC for Application No. 10 776 345.0-1956, dated May 31, 2013, pp. 1-6.
Notice of Allowance for U.S. Appl. No. 13/462,152 dated Jun. 7, 2013, pp. 1-13.
Notice of Allowance for U.S. Appl. No. 12/821,175 dated Jun. 20, 2013, pp. 1-14.
Communication Pursuant to Article 94(3) EPC for Application No. 10 778 994.3-1960, dated Jul. 3, 2013, pp. 1-7.

* cited by examiner

1500

STORE PCI FUNCTION CONTROLS

CONTROLLING THE SELECTIVELY SETTING OF OPERATIONAL PARAMETERS FOR AN ADAPTER

BACKGROUND

This invention relates, in general, to input/output processing of a computing environment, and in particular, to facilitating communication with adapters of the computing environment.

A computing environment may include one or more types of input/output devices, including various types of adapters. One type of adapter that may be included is a Peripheral Component Interconnect (PCI) or Peripheral Component Interconnect express (PCIe) adapter. The adapter uses a common, industry standard bus-level and link-level protocol for communication. However, its instruction-level protocol is vendor specific.

Communication between the devices and the system requires certain initialization and the establishment of particular data structures.

BRIEF SUMMARY

In accordance with an aspect of the present invention, a capability is provided to facilitate communication between adapters and processors. For example, a capability is provided that enables operational parameters to be set for a particular operation associated with an adapter. In a further aspect of the present invention, a copy of the operational parameters are made available to the operating system.

The shortcomings of the prior art are overcome and advantages are provided through the provision of a computer program product for executing a machine instruction in a central processing unit. The computer program product includes a computer readable storage medium readable by a processing circuit and storing instructions for execution by the processing circuit for performing a method. The method includes, for instance, obtaining a machine instruction for execution, the machine instruction being defined for computer execution according to a computer architecture, the machine instruction including an opcode field identifying a modify adapter instruction; a first field identifying a location, the contents of which include a function handle identifying an adapter, a designation of an address space associated with the adapter to which a modify operation applies, and an operation control specifying the operation to be performed for the adapter, the operation control specifying one operation of a plurality of operations that can be selected; and a second field for identifying an address of a function information block to be used by the modify operation; and executing the machine instruction, the executing including, for instance, determining a value of the operation control; and modifying, responsive to the operation control, a table entry that includes parameters associated with the adapter, wherein the modifying includes selectively updating one or more parameters of the table entry based on the operation control and based on one or more checks that depend on the operation control.

In accordance with another aspect of the present invention, a computer program product for executing a machine instruction in a central processing unit is provided. The computer program product includes a computer readable storage medium readable by a processing circuit and storing instructions for execution by the processing circuit for performing a method. The method includes, for instance, obtaining a machine instruction for execution, the machine instruction being defined for computer execution according to a computer architecture, the machine instruction including, for instance, an opcode field identifying a store instruction; a first field identifying a location, the contents of which include a function handle identifying an adapter and a designation of an address space associated with the adapter to which the store operation applies; and a second field for identifying a location where a result of the instruction is to be stored; and executing the machine instruction, the executing includes, for instance, obtaining information from a function information block associated with the adapter; and copying the information from the function information block into the location, responsive to a successful completion of one or more validity checks.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a general purpose mechanism is provided to establish various operational parameters for an adapter. In particular, an instruction, referred to as a Modify PCI Function Controls instruction, is provided that enables the establishment of various operational parameters for an adapter depending on a specified operation control. This one instruction, which is issued by an operating system (as used herein, operating system includes device drivers) and executed by the firmware of a processor, enables selective and controlled modification of a device table entry (employed by hardware) and other firmware controls based on specified operation controls.

Further, in another aspect of the present invention, another instruction, referred to as a Store Modify PCI Function Controls instruction, is provided that stores the current values of the operational parameters (e.g., contents of a function information block) in a designated location accessible to the operating system.

As used herein, the term adapter includes any type of adapter (e.g., storage adapter, network adapter, processing adapter, PCI adapter, cryptographic adapter, other type of input/output adapters, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. In one embodiment, if an adapter includes a plurality of adapter functions, then operational parameters for each function may be set in accordance with an aspect of the present invention. Moreover, in the examples presented herein, adapter is used interchangeably with adapter function (e.g., PCI function) unless otherwise noted.

Figure 1A:
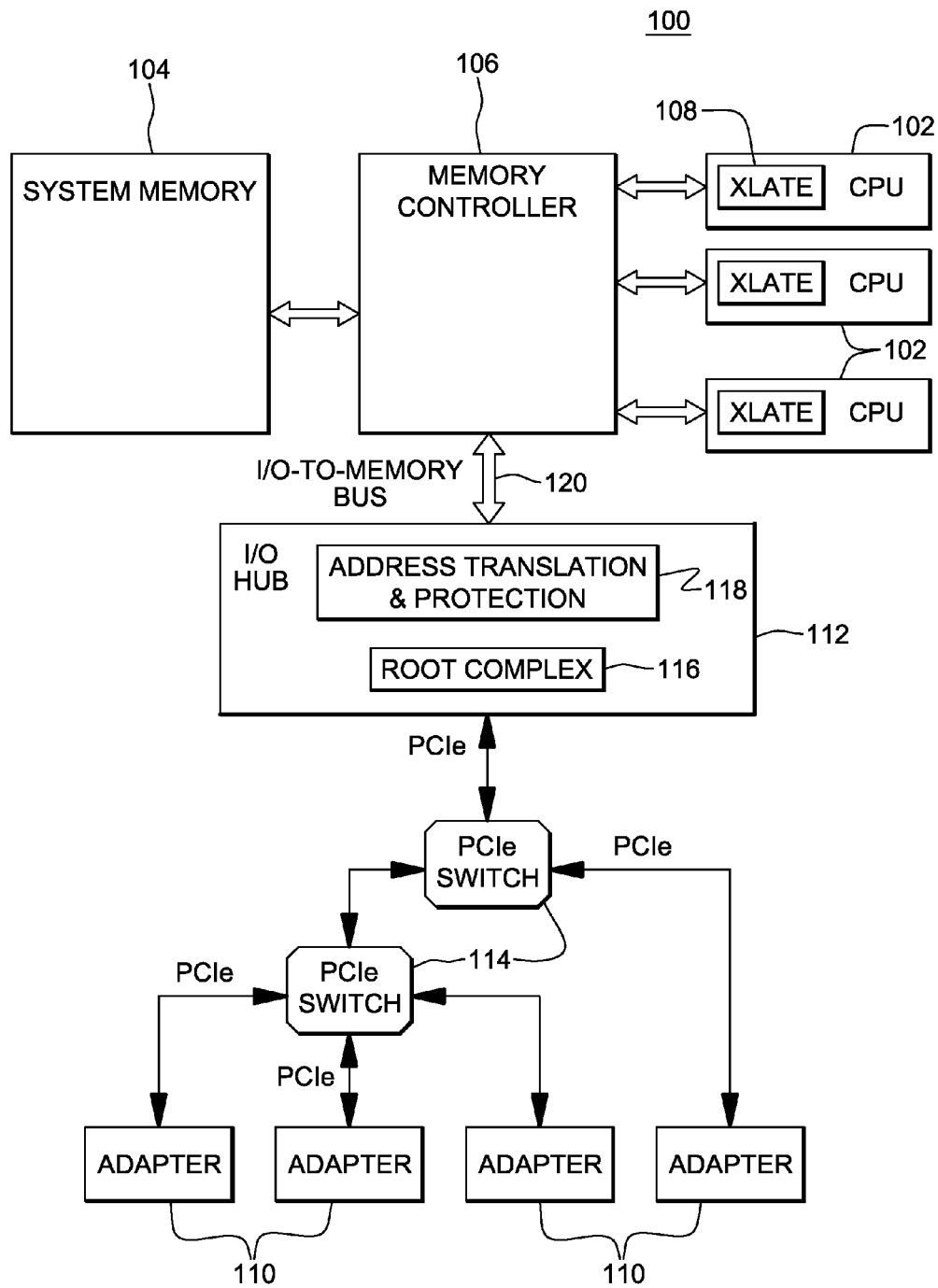
FIG. 1A depicts one embodiment of a computing environment to incorporate or use one or more aspects of the present invention.

One embodiment of a computing environment to incorporate and use one or more aspects of the present invention is described with reference to FIG. 1A. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM® Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. System memory, which includes one or more address spaces (a portion of memory assigned to a particular component—e.g., adapter), is accessed by CPUs 102 via memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that is routed to an input/output hub 112 (e.g., a PCI hub) via one or more switches (e.g., PCIe switches) 114. In one example, the input/output hub is comprised of hardware, including one or more state machines, and is coupled to memory controller 106 via an I/O-to-memory bus 120.

The input/output hub includes, for instance, a root complex 116 that receives the request from a switch. The request includes an input/output address that is provided to an address translation and protection unit 118 which accesses information used for the request. As examples, the request may include an input/output address used to perform a direct memory access (DMA) operation or to request a message signaled interruption (MSI). Address translation and protection unit 118 accesses information used for the DMA or MSI request. As a particular example, for a DMA operation, information may be obtained to translate the address. The translated address is then forwarded to the memory controller to access system memory.

Figure 1B:
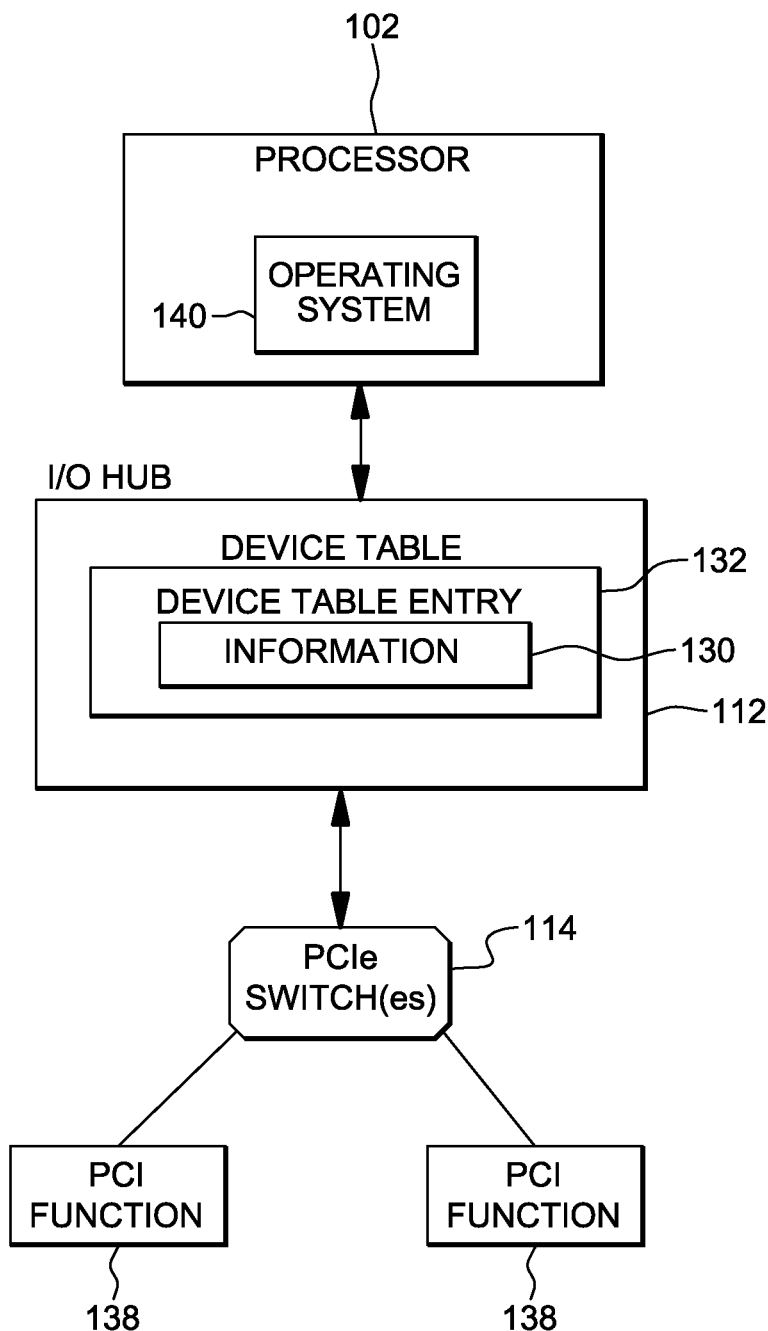
FIG. 1B depicts one embodiment of a device table entry located in the I/O hub of FIG. 1A and used in accordance with an aspect of the present invention.

In one example, as described with reference to FIG. 1B, information used for the DMA or MSI request issued by an adapter is obtained from a device table entry 130 of a device table 132 located in the Input/Output (I/O) hub (e.g., in the address translation and protection unit). The device table entry includes information for the adapter. Specifically, it includes operational parameters used to perform certain operations associated with its adapter. The particular parameters stored depends on the operation and are described more fully below.

Each adapter has at least one device table entry associated therewith. For instance, there is one device table entry per address space (in system memory) assigned to the adapter. For a request issued from an adapter (e.g., PCI function 138), a device table entry is located using a requestor ID provided in the request.

Figure 1C:
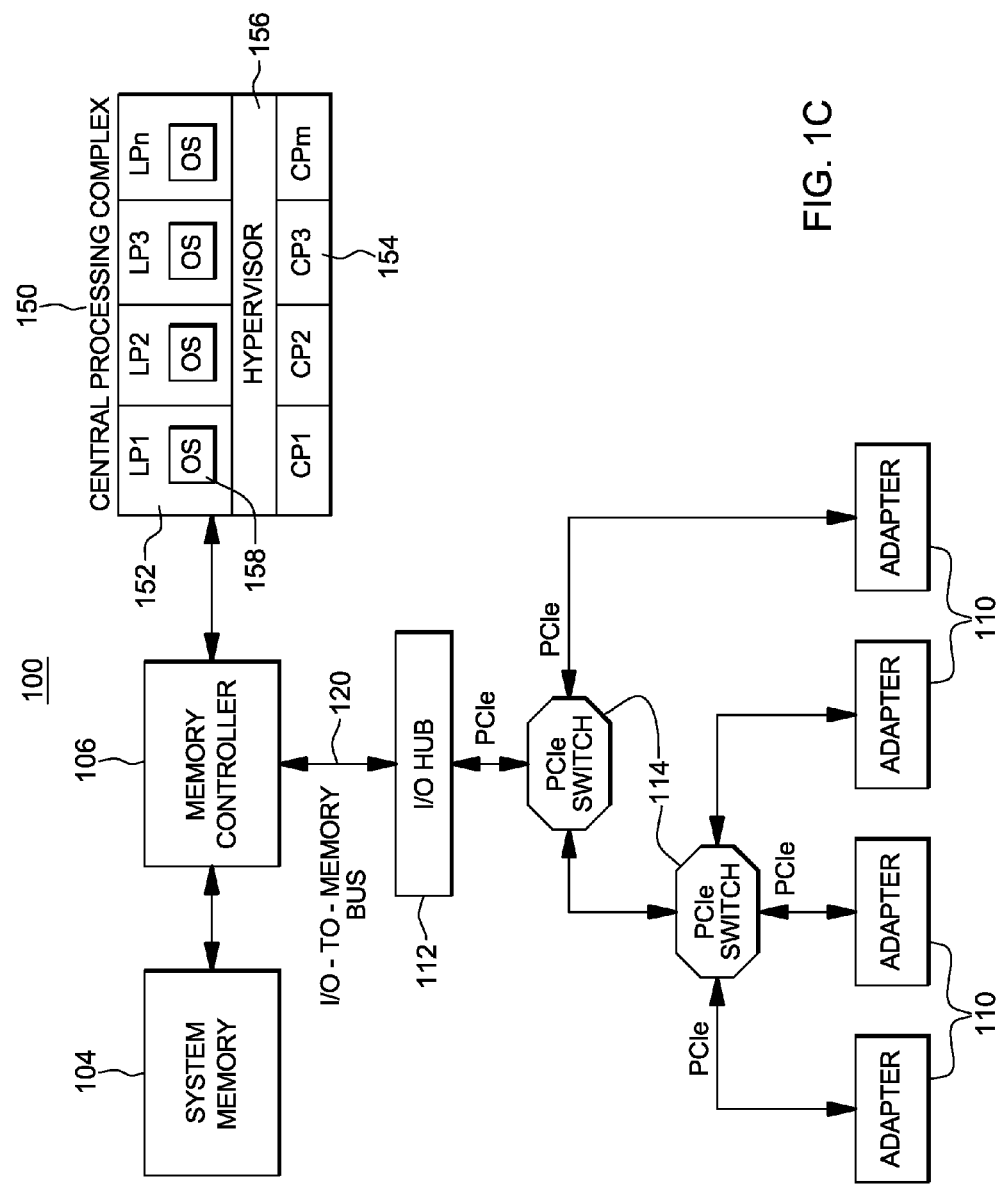
FIG. 1C depicts another embodiment of a computing environment to incorporate and use one or more aspects of the present invention.

In a further embodiment of a computing environment, in addition to or instead of one or more CPUs 102, referring to FIG. 1C, a central processing complex is coupled to memory controller 106. In this example, a central processing complex 150 includes, for instance, one or more partitions or zones 152 (e.g., logical partitions LP1-LPn), one or more central processors (e.g., CP1-CPm) 154, and a hypervisor 156 (e.g., a logical partition manager), each of which is described below.

Each logical partition 152 is capable of functioning as a separate system. That is, each logical partition can be independently reset, initially loaded with an operating system or a hypervisor (such as z/VM® offered by International Business Machines Corporation, Armonk, N.Y.), if desired, and operate with different programs. An operating system, a hypervisor, or an application program running in a logical partition appears to have access to a full and complete system, but only a portion of it is available. A combination of hardware and Licensed Internal Code (also referred to as microcode or millicode) keeps a program in a logical partition from interfering with the program in a different logical partition. This allows several different logical partitions to operate on a single or multiple physical processor in a time slice manner. In this particular example, each logical partition has a resident operating system 158, which may differ for one or more logical partitions. In one embodiment, operating system 158 is a z/OS® or zLinux operating system, offered by International Business Machines Corporation, Armonk, N.Y. z/OS® and z/VM® are registered trademarks of International Business Machines Corporation, Armonk, N.Y.

Central processors 154 are physical processor resources that are allocated to the logical partitions. For instance, a logical partition 152 includes one or more logical processors, each of which represents all or a share of the physical processor resource 154 allocated to the partition. The underlying processor resource may either be dedicated to that partition or shared with another partition.

Logical partitions 152 are managed by hypervisor 156 implemented by firmware running on processors 154. Logical partitions 152 and hypervisor 156 each comprise one or more programs residing in respective portions of central storage associated with the central processors. One example of hypervisor 156 is the Processor Resource/Systems Manager (PR/SM), offered by International Business Machines Corporation, Armonk, N.Y.

As used herein, firmware includes, e.g., the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Although, in this example, a central processing complex having logical partitions is described, one or more aspects of the present invention may be incorporated in and used by other processing units, including single or multi-processor processing units that are not partitioned, among others. The central processing complex described herein is only one example.

As described above, adapters can issue requests to the processors requesting various operations, such as direct memory accesses, message signaled interrupts, etc. Further, the processors can issue the requests to the adapters. For instance, returning to FIG. 1B, a processor 102 can issue requests to access an adapter function 138. The request is routed from the processor to the adapter function via I/O hub 112 and one or more switches 114. In this embodiment, the memory controller is not shown. However, the I/O hub may be coupled to the processor directly or via a memory controller.

In one particular example, an operating system 140 executing within the processor issues an instruction to the adapter function requesting a particular operation (e.g., read/write). In another example, in accordance with an aspect of the present invention, the operating system issues an instruction to establish operational parameters for an adapter function or to obtain a copy of operational parameters specific to an adapter function. These instructions are referred to as a Modify PCI Function Controls instruction and a Store PCI Function Controls instruction, respectively, and are executed by a processor.

In this example, the Modify PCI Function Controls instruction and the Store PCI Function Controls instruction issued by the operating system are specific to the I/O infrastructure. That is, since the I/O infrastructure is based on PCI or PCIe (both of which are referred to herein as PCI, unless otherwise noted), the instructions are PCI instructions. Although in this example, the I/O infrastructure and instructions are based on PCI, in other embodiments, other infrastructures and corresponding instructions may be used.

Figure 2:
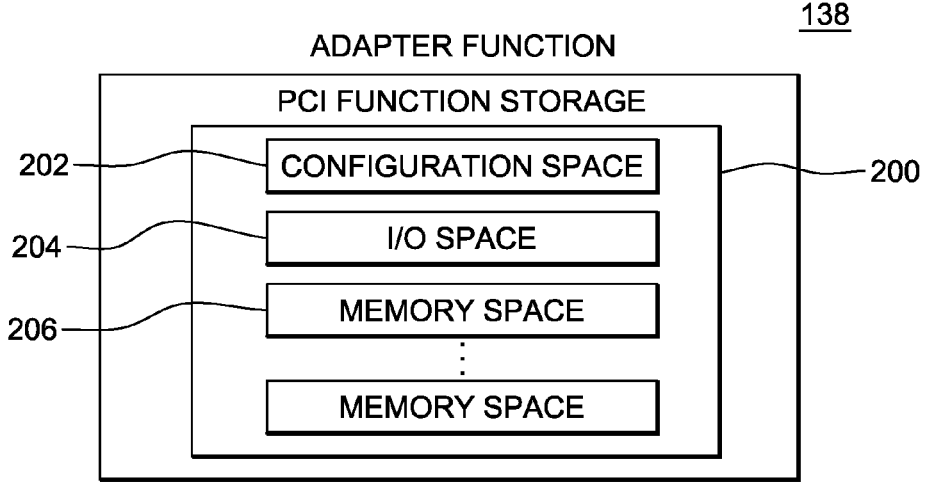
FIG. 2 depicts one example of address spaces of an adapter function, in accordance with an aspect of the present invention.

Further details regarding adapter function 138 are described with reference to FIG. 2. As shown in FIG. 2, adapter function 138 includes storage 200, which is defined as a plurality of address spaces, including, for instance: a configuration space 202 (e.g., PCI configuration space for a PCI function); an I/O space 204 (e.g., PCI I/O space); and one or more memory spaces 206 (e.g., PCI memory space). In other embodiments, more, less or different address spaces may be provided.

Figure 3A:
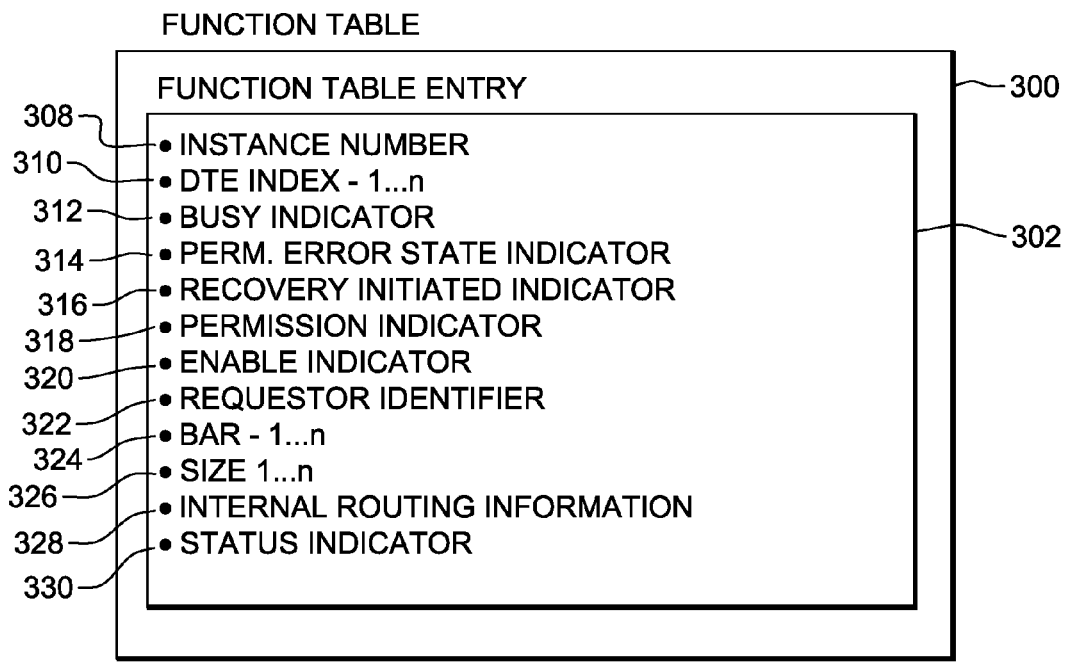
FIG. 3A depicts one example of a function table entry used in accordance with an aspect of the present invention.

Associated with each adapter function is a function table entry. As shown in FIG. 3A, in one example, a function table 300 includes one or more function table entries (FTEs) 302. In one example, there is one function table entry per adapter function. Each function table entry 302 includes information to be used in processing associated with its adapter function. In one example, function table entry 302 includes, for instance:

- Instance Number 308: This field indicates a particular instance of the adapter function handle associated with the function table entry;
- Device Table Entry (DTE) Index 1 . . . n 310: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.
- Busy Indicator 312: This field indicates whether the adapter function is busy;
- Permanent Error State Indicator 314: This field indicates whether the adapter function is in a permanent error state;
- Recovery Initiated Indicator 316: This field indicates whether recovery has been initiated for the adapter function;
- Permission Indicator 318: This field indicates whether the operating system trying to control the adapter function has authority to do so;
- Enable Indicator 320: This field indicates whether the adapter function is enabled (e.g., 1=enabled, 0=disabled);
- Requestor Identifier (RID) 322: This is an identifier of the adapter function, and includes, for instance, a bus number, a device number and a function number.
  In one example, this field is used, for accesses of a configuration space of the adapter function. For instance, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.
- Base Address Register (BAR) (1 to n) 324: This field includes a plurality of unsigned integers, designated as $BAR_0$-$BAR_n$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;
  In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;
- Size 1 . . . n 326: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.

1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.
3. When a BAR field represents a 64-bit memory address space,
   a. The $BAR_n$ field represents the least significant address bits.
   b. The next consecutive $BAR_{n+1}$ field represents the most significant address bits.
   c. The corresponding $SIZE_n$ field is non-zero and represents the size of the address space.
   d. The corresponding $SIZE_{n+1}$ field is not meaningful and is stored as zero.
- Internal Routing Information 328: This information is used to perform particular routing to the adapter. It includes, for instance, node, processor chip, and hub addressing information, as examples.
- Status Indication 330: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). In other embodiments, the function table entry may include more, less or different information. The information included may depend on the operations supported by or enabled for the adapter function.

Figure 3B:
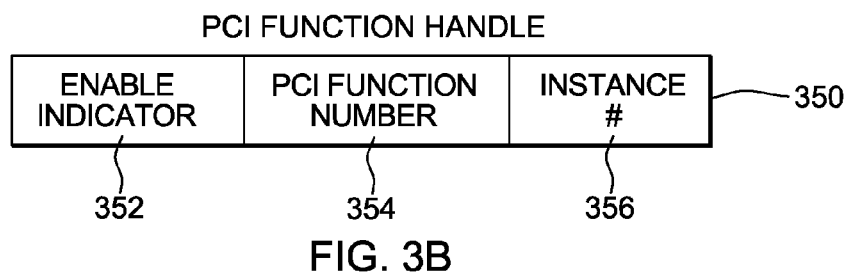
FIG. 3B depicts one embodiment of a function handle used in accordance with an aspect of the present invention.

To locate a function table entry in a function table that includes one or more entries, in one embodiment, a function handle is used. For instance, one or more bits of the function handle are used as an index into the function table to locate a particular function table entry. There is a function handle for each adapter function. In one particular example, as shown in FIG. 3B, a function handle 350 includes, for instance, an enable indicator 352 indicating whether the handle is enabled; a function number 354 that identifies the function (this is a static identifier and may be used to index into the function table); and an instance number 356 specifying the particular instance of this function handle.

In accordance with an aspect of the present invention, a configuration (e.g., an operating system) is provided the capability to establish operational parameters for an adapter function. These operational parameters are set for a particular operation to be performed for or on behalf of the adapter function. In one example, this capability includes a Modify PCI Function Controls instruction, an example of which is described with reference to FIGS. 4A-4D.

Figure 4A:
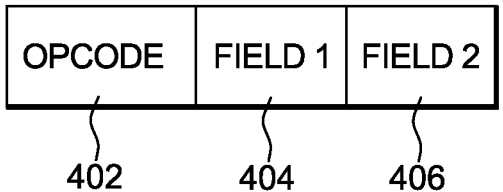
FIG. 4A depicts one embodiment of a Modify PCI Function Controls instruction used in accordance with an aspect of the present invention.

Referring to FIG. 4A, a Modify PCI Function Controls instruction 400 includes, for instance, an op code 402 indicating the Modify PCI Function Controls instruction; a first field 404 specifying a location at which various information is included regarding the adapter function for which the operational parameters are being established; and a second field 406 specifying a location from which a PCI function information block (FIB) is fetched. The contents of the locations designated by Fields 1 and 2 are further described below.

Figure 4B:
FIG. 4B depicts one embodiment of a field used by the Modify PCI Function Controls instruction of FIG. 4A, in accordance with an aspect of the present invention.

In one embodiment, Field 1 designates a general register that includes various information. As shown in FIG. 4B, the contents of the register include, for instance, a function handle 410 that identifies the handle of the adapter function on behalf of which the modify instruction is being performed; an address space 412 designating an address space in system memory associated with the adapter function designated by the function handle; an operation control 414 which specifies the operation to be performed for the adapter function; and status 416 which provides status regarding the instruction when the instruction completes with a predefined code.

Figure 4C:
FIG. 4C depicts one embodiment of another field used by the Modify PCI Function Controls instruction of FIG. 4A, in accordance with an aspect of the present invention.

In one example, as shown in FIG. 4C, Field 2 designates a logical address 420 of a PCI function information block (FIB), which includes information regarding an associated adapter function. The function information block is used, in accordance with an aspect of the present invention, to update a device table entry and/or function table entry (or other location) associated with the adapter function. Prior to issuing the instruction, the information is stored in the FIB during initialization and/or configuration of the adapter, and/or responsive to a particular event.

Figure 4D:
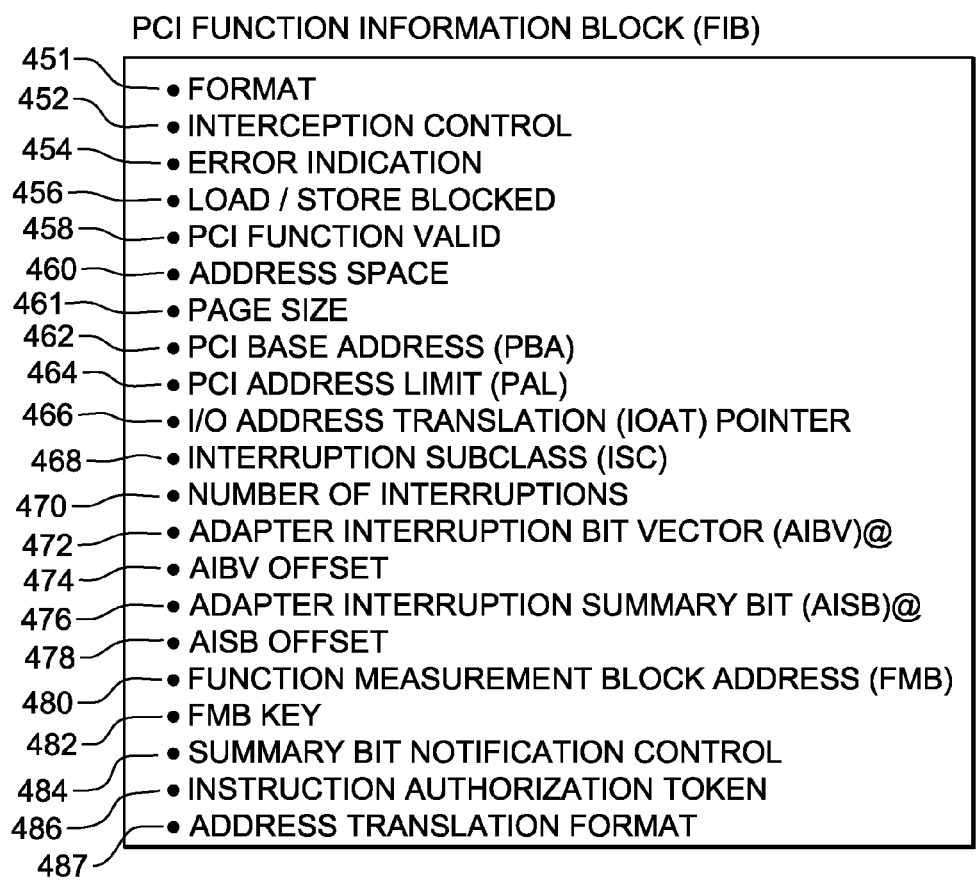
FIG. 4D depicts one embodiment of the contents of a function information block (FIB) used in accordance with an aspect of the present invention.

Further details regarding a function information block are described with reference to FIG. 4D. In one embodiment, a function information block 450 includes the following fields:

Format 451: This field specifies the format of the FIB.
Interception Control 452: This field is used to indicate whether guest execution of specific instructions by a pageable mode guest results in instruction interception;
Error Indication 454: This field includes the error state indication for direct memory access and adapter interruptions. When the bit is set (e.g., 1), one or more errors have been detected while performing direct memory access or adapter interruption for the adapter function;
Load/Store Blocked 456: This field indicates whether load/store operations are blocked;
PCI Function Valid 458: This field includes an enablement control for the adapter function. When the bit is set (e.g., 1), the adapter function is considered to be enabled for I/O operations;
Address Space Registered 460: This field includes a direct memory access enablement control for an adapter function. When the field is set (e.g., 1) direct memory access is enabled;
Page Size 461: This field indicates the size of the page or other unit of memory to be accessed by a DMA memory access;
PCI Base Address (PBA) 462: This field is a base address for an address space in system memory assigned to the adapter function. It represents the lowest virtual address that an adapter function is allowed to use for direct memory access to the specified DMA address space;
PCI Address Limit (PAL) 464: This field represents the highest virtual address that an adapter function is allowed to access within the specified DMA address space;
Input/Output Address Translation Pointer (IOAT) 466: The input/output address translation pointer designates the first of any translation tables used by a PCI virtual address translation, or it may directly designate the absolute address of a frame of storage that is the result of translation;
Interruption Subclass (ISC) 468: This field includes the interruption subclass used to present adapter interruptions for the adapter function;
Number of Interruptions (NOI) 470: This field designates the number of distinct interruption codes accepted for an adapter function. This field also defines the size, in bits, of the adapter interruption bit vector designated by an adapter interruption bit vector address and adapter interruption bit vector offset fields;
Adapter Interruption Bit Vector Address (AIBV) 472: This field specifies an address of the adapter interruption bit vector for the adapter function. This vector is used in interrupt processing;
Adapter Interruption Bit Vector Offset 474: This field specifies the offset of the first adapter interruption bit vector bit for the adapter function;
Adapter Interruption Summary Bit Address (AISB) 476: This field provides an address designating the adapter interruption summary bit, which is optionally used in interrupt processing;
Adapter Interruption Summary Bit Offset 478: This field provides the offset into the adapter interruption summary bit vector;
Function Measurement Block (FMB) Address 480: This field provides an address of a function measurement block used to collect measurements regarding the adapter function;
Function Measurement Block Key 482: This field includes an access key to access the function measurement block;
Summary Bit Notification Control 484: This field indicates whether there is a summary bit vector being used; and
Instruction Authorization Token 486: This field is used to determine whether a pageable storage mode guest (e.g., V=V guest) is authorized to execute PCI instructions without host intervention.
In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE; and Address Translation Format 487: This field indicates a selected format for address translation of the highest level translation table to be used in translation (e.g., an indication of highest level table (e.g. segment table, region 3rd, etc.) and an indication of the selected format (e.g., CPU DAT compatible, I/O extended address translation format, a bypass format, a no fetch format).

The function information block designated in the Modify PCI Function Controls instruction is used, in accordance with an aspect of the present invention, to modify a selected device table entry, a function table entry or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 5. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 5:
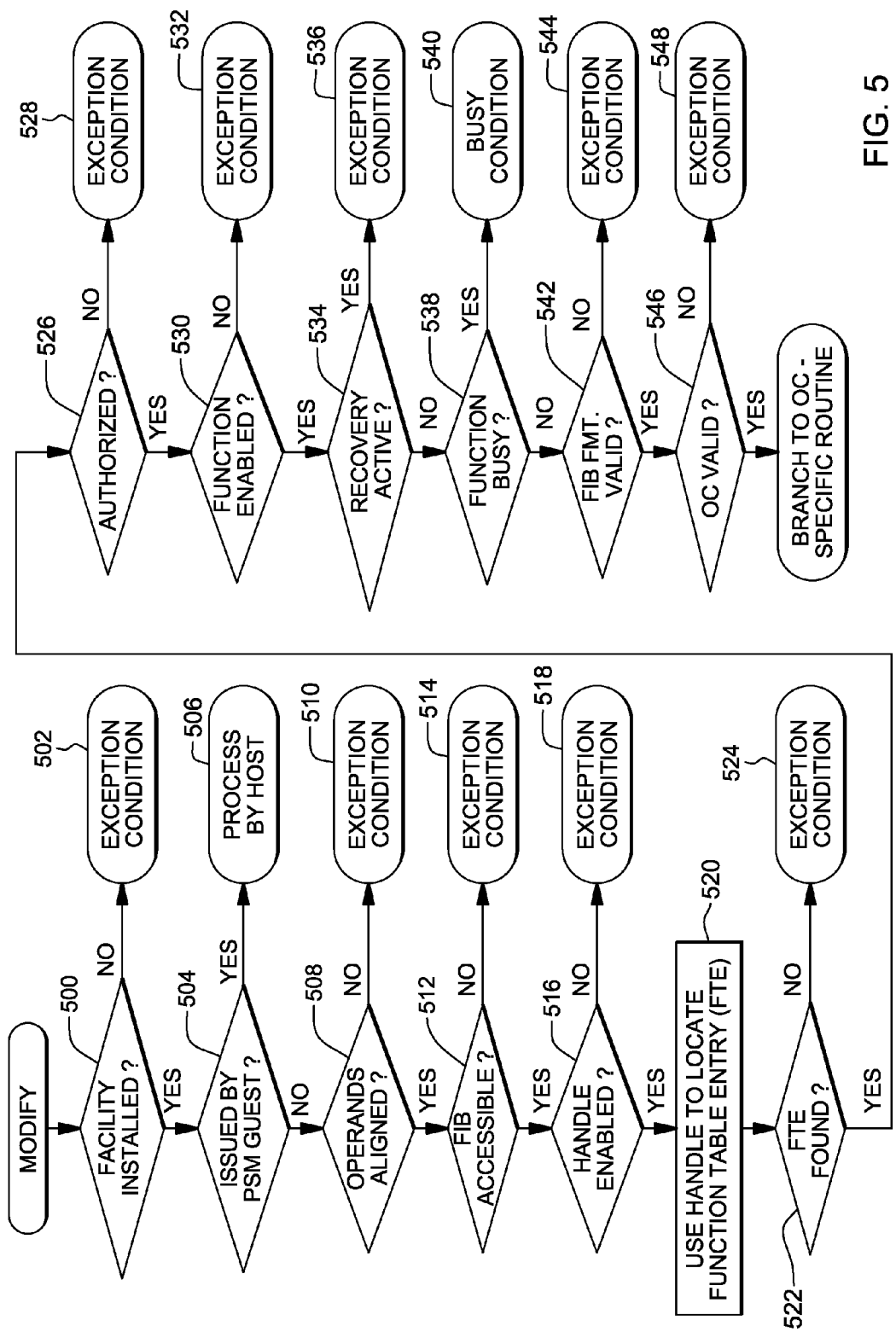
FIG. 5 depicts one embodiment of an overview of the logic of the Modify PCI Function Controls instruction, in accordance with an aspect of the present invention.

Referring to FIG. 5, initially, a determination is made as to whether the facility allowing for a Modify PCI Function Controls instruction is installed, INQUIRY 500. This determination is made by, for instance, checking an indicator stored in, for instance, a control block. If the facility is not installed, an exception condition is provided, STEP 502. Otherwise, a determination is made as to whether the instruction was issued by a pageable storage mode guest (or other guest, such as a non-pageable storage mode guest), INQUIRY 504. If yes, the host operating system will emulate the operation for that guest, STEP 506.

Otherwise, a determination is made as to whether one or more of the operands are aligned, INQUIRY 508. For instance, a determination is made as to whether the address of the function information block is on a double word boundary. In one example, this is optional. If the operands are not aligned, then an exception condition is provided, STEP 510. Otherwise, a determination is made as to whether the function information block is accessible, INQUIRY 512. If not, then an exception condition is provided, STEP 514. Otherwise, a determination is made as to whether the handle provided in the operands of the Modify PCI Function Controls instruction is enabled, INQUIRY 516. In one example, this determination is made by checking an enable indicator in the handle. If the handle is not enabled, then an exception condition is provided, STEP 518.

If the handle is enabled, then the handle is used to locate a function table entry, STEP 520. That is, at least a portion of the handle is used as an index into the function table to locate the function table entry corresponding to the adapter function for which operational parameters are to be established.

A determination is made as to whether the function table entry was found, INQUIRY 522. If not, then an exception condition is provided, STEP 524. Otherwise, if the configuration issuing the instruction is a guest, INQUIRY 526, then an exception condition (e.g., interception to host) is provided, STEP 528. This inquiry may be ignored if the configuration is not a guest or other authorizations may be checked, if designated.

A determination is then made as to whether the function is enabled, INQUIRY 530. In one example, this determination is made by checking an enable indicator in the function table entry. If it is not enabled, then an exception condition is provided, STEP 532.

If the function is enabled, then a determination is made as to whether recovery is active, INQUIRY 534. If recovery is active as determined by a recovery indicator in the function table entry, then an exception condition is provided, STEP 536. However, if recovery is not active, then a further determination is made as to whether the function is busy, INQUIRY 538. This determination is made by checking the busy indicator in the function table entry. If the function is busy, then a busy condition is provided, STEP 540. With the busy condition, the instruction can be retried, instead of dropped.

If the function is not busy, then a further determination is made as to whether the function information block format is valid, INQUIRY 542. For instance, the format field of the FIB is checked to determine if this format is supported by the system. If it is invalid, then an exception condition is provided, STEP 544. If the function information block format is valid, then a further determination is made as to whether the operation control specified in the operands of the instruction is valid, INQUIRY 546. That is, is the operation control one of the specified operation controls for this instruction. If it is invalid, then an exception condition is provided, STEP 548. However, if the operation control is valid, then processing continues with the specific operation control being specified.

In one example, the operation control is a register adapter interruptions operation, which is used for controlling adapter interruptions. Responsive to this operation control, the adapter function parameters relevant to adapter interruptions are set in the device table entry based on the appropriate contents of the function information block.

One embodiment of the logic associated with this operation is described with reference to FIG. 6. As one example, the operands for this operation, which are obtained from the function information block, include for instance: an interruption subclass (ISC); number of interruptions allowed (NOI); an adapter interruption bit vector offset (AIBVO); a summary notification (S); an adapter interruption summary bit vector offset ABVSO); an adapter interruption bit vector (AIBV) address; and an adapter interruption summary bit vector (AISB) address.

Figure 6:
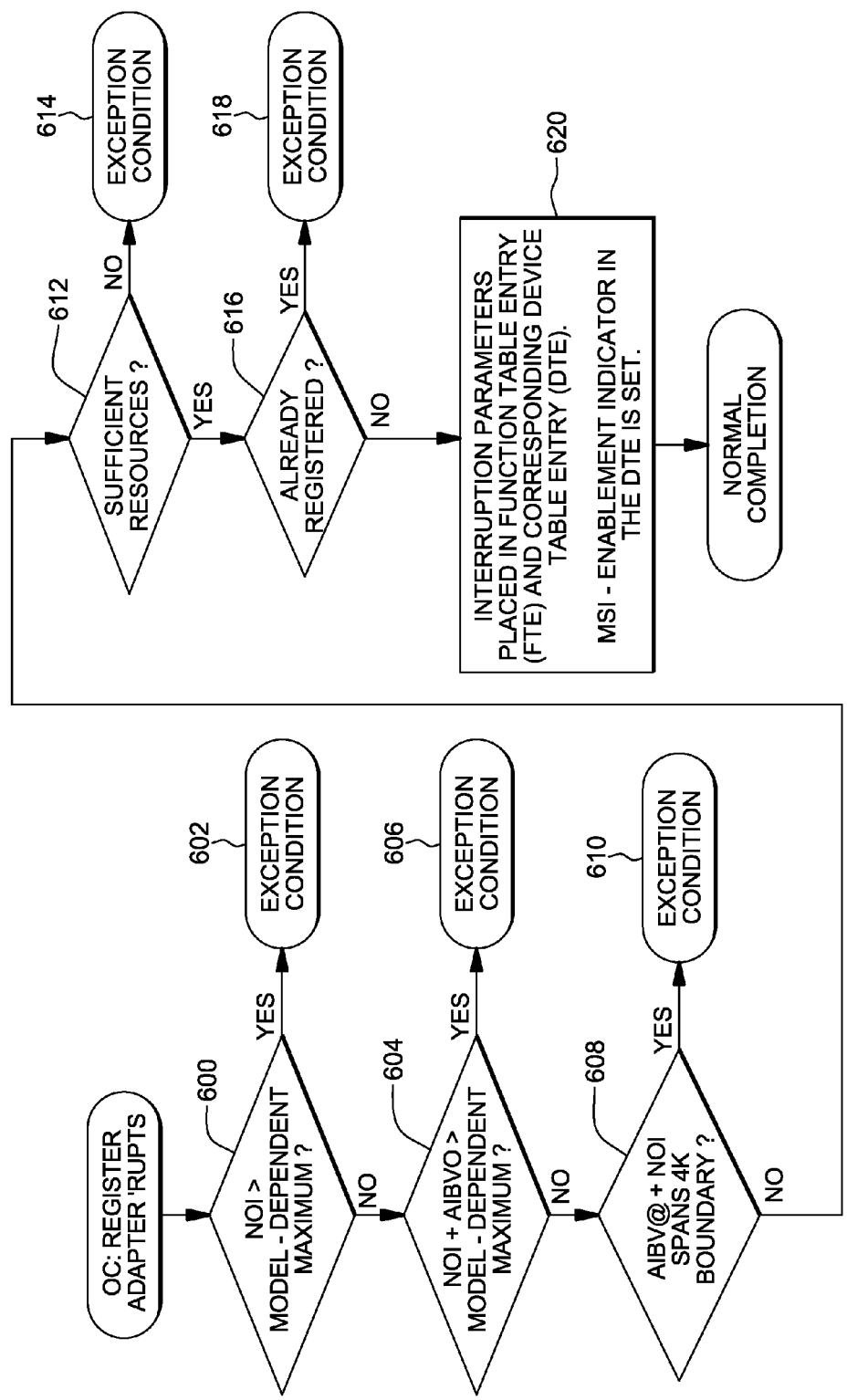
FIG. 6 depicts one embodiment of the logic associated with a register adapter interruptions operation that may be specified by the Modify PCI Function Controls instruction, in accordance with an aspect of the present invention.

Referring to FIG. 6, initially, a determination is made as to whether the number of interruptions (NOIs) specified in the FIB is greater than a model-dependent maximum, INQUIRY 600. If so, then an exception condition is provided, STEP 602. However, if the number of interruptions is not greater than the model-dependent maximum, then a further determination is made as to whether the number of interruptions added to the adapter interruption bit vector offset (NOI+AIBVO) is greater than a model-dependent maximum, INQUIRY 604. If so, then an exception condition is provided, STEP 606. If the NOI plus the AIBVO is not greater than a model-dependent maximum, then a further determination is made as to whether the AIBV address plus the NOI spans a 4K boundary, INQUIRY 608. If it does span the 4K boundary, then an exception condition is provided, STEP 610. Otherwise, a determination is made as to whether sufficient resources are available for any resources needed, STEP 612. If there are not sufficient resources, then an exception condition is provided, STEP 614.

Otherwise, a determination is made as to whether adapter interruptions are already registered for this function, STEP 616. In one embodiment, this would be determined by checking one or more of the parameters (e.g., in the FIB). In particular, parameters associated with interruptions, such as NOI, are checked. If the fields are populated, then the adapter is registered for interrupts. If the adapter is already registered, then an exception condition is provided, STEP 618. Otherwise, the interruption parameters are obtained from the FIB and placed in the function table entry (or other specified location) and corresponding device table entry (DTE). Also, an MSI enablement indicator is set in the DTE, STEP 620. That is, the PCI function parameters relevant to adapter interruption are set in the FTE and/or DTE based on the information retrieved from the function information block. These parameters include, for instance, the ISC, NOI, AIBVO, S, AIBVSO, AIBV address and the AISB address.

In addition to the above, another operation control that can be specified is an unregister adapter interruptions operation, an example of which is described with reference to FIG. 7. With this operation, the adapter function parameters relevant to adapter interruption are reset.

Figure 7:
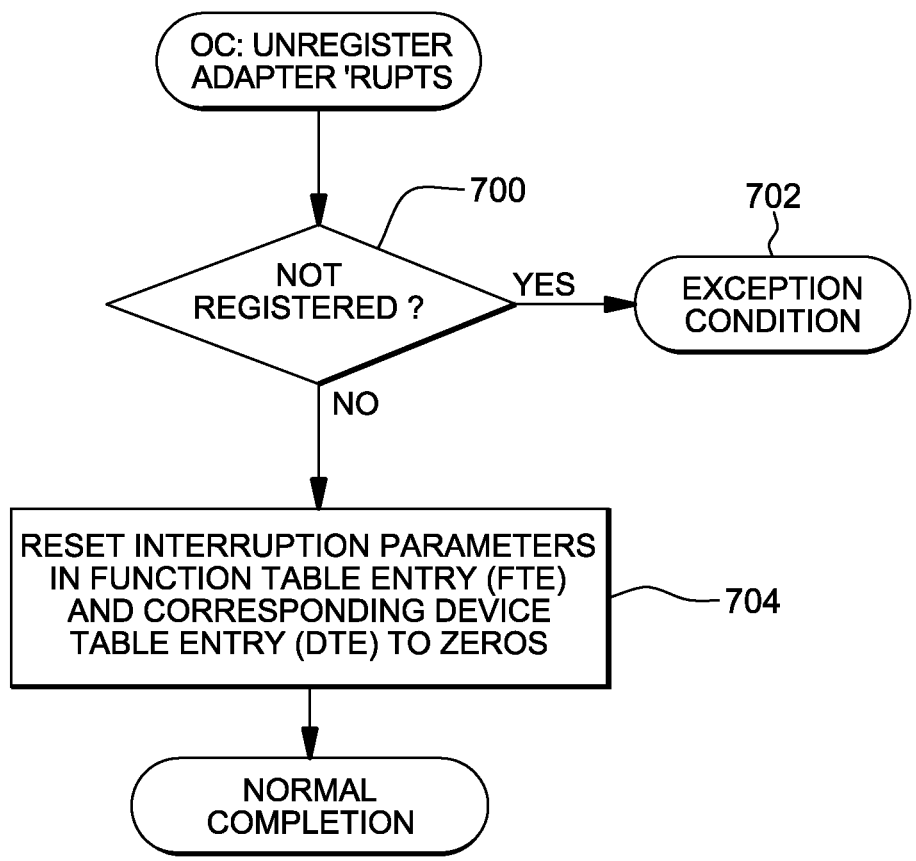
FIG. 7 depicts one embodiment of the logic associated with an unregister adapter interruptions operation that may be specified by the Modify PCI Function Controls instruction, in accordance with an aspect of the present invention.

Referring to FIG. 7, initially, a determination is made as to whether the adapter specified by the function handle is registered for interrupts, INQUIRY 700. If not, then an exception condition is provided, STEP 702. Otherwise, the interruption parameters in the function table entry (or other location) and corresponding device table entry are set to zeros, INQUIRY 704. In one example, these parameters include the ISC, NOI, AIBVO, S, AIBSO, AIBV address and AISB address.

In addition to the above, another operation control that may be specified is a register I/O address translation parameters operation used in controlling address translations for an adapter. With this operation, the PCI function parameters relevant to I/O address translation are set from the appropriate parameters of the FIB. These parameters include, for instance, the PCI base address; the PCI address limit (a.k.a., PCI limit or limit); the I/O address translation pointer; the address translation format; and the page size, which are operands to this operation. There are also implied operands, including a starting DMA address (SDMA) and an ending DMA address (EDMA), which are stored in a location accessible to the processor executing the instruction.

Figure 8:
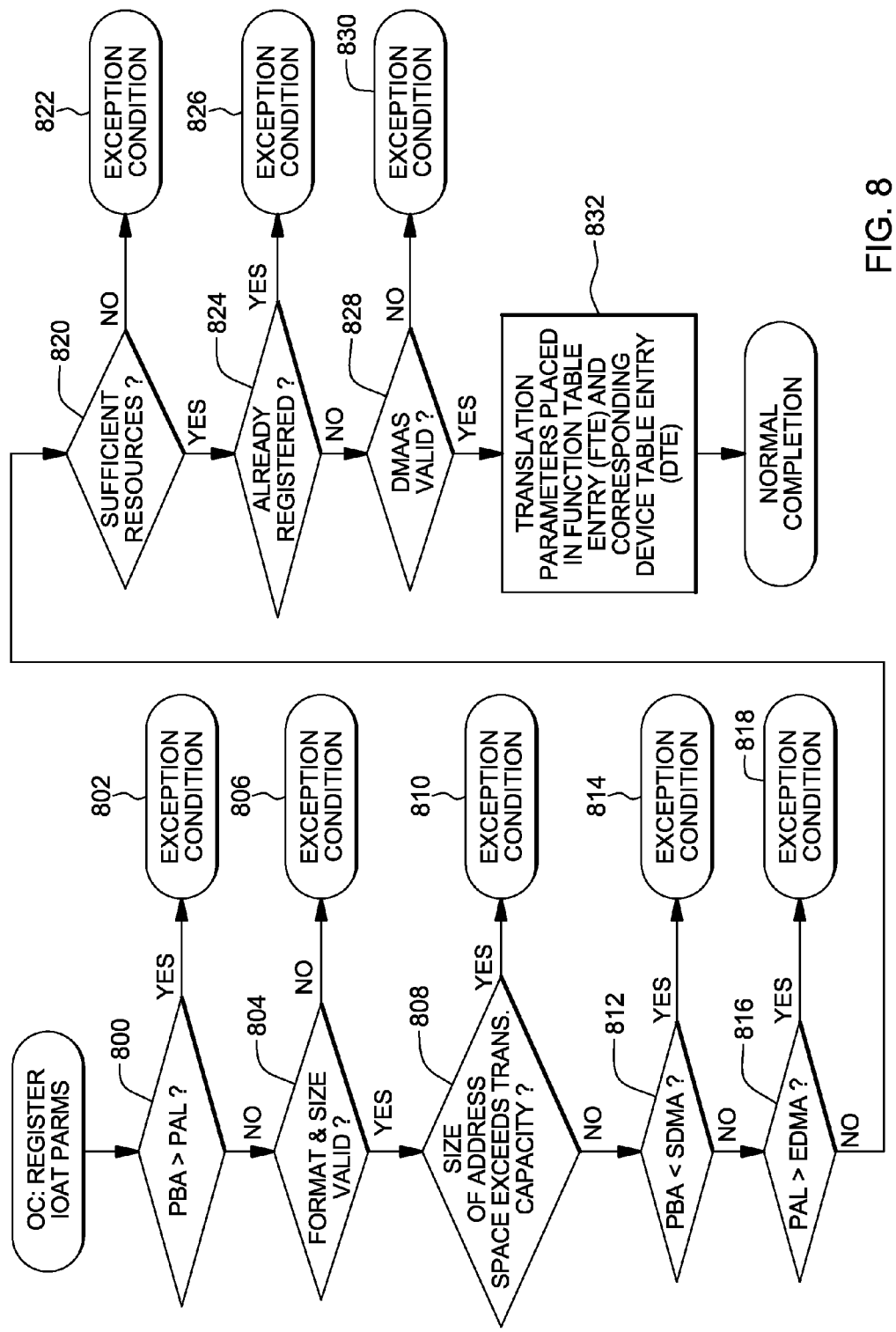
FIG. 8 depicts one embodiment of the logic associated with a register I/O address translation parameters operation that may be specified by the Modify PCI Function Controls instruction, in accordance with an aspect of the present invention.

One embodiment of the logic to establish the operational parameters for I/O address translation is described with reference to FIG. 8. Initially, a determination is made as to whether the PCI base address in the FIB is greater than the PCI limit in the FIB, INQUIRY 800. If the comparison of the base address and the limit indicate that the base address is greater than the limit, then an exception condition is recognized, STEP 802. However, if the base address is less than or equal to the limit, then a further determination is made as to whether the translation format and the page size are valid, INQUIRY 804. If they are invalid, then an exception condition is provided, STEP 806. However, if they are valid, then a further determination is made as to whether the size of the address space (based on the base address and limit) exceeds the translation capacity, INQUIRY 808. In one example, the size of the address space is compared to the maximum address translation capacity possible based on the format of the upper level table. For example, if the upper level table is a DAT compatible segment table, the maximum translation capacity is 2 Gigabytes.

If the size of the address space exceeds the translation capacity, then an exception condition is provided, STEP 810. Otherwise, a further determination is made as to whether the base address is less than the starting DMA address, INQUIRY 812. If so, then an exception condition is provided, STEP 814. Otherwise, another determination is made as to whether the address limit is greater than the ending DMA address, INQUIRY 816. If so, then an exception condition is provided, STEP 818. In one example, the starting DMA address and ending DMA address are based on a system-wide policy.

Thereafter, a determination is made as to whether sufficient resources, if any are needed, are available to perform an I/O address translation, INQUIRY 820. If not, then an exception condition is provided, STEP 822. Otherwise, a further determination is made as to whether the I/O address translation parameters have already been registered in the DTE and FTE, INQUIRY 824. This is determined by checking the values of the parameters in the DTE/FTE. For instance, if the values in the DTE/FTE are zero or another defined value, then registration has not been performed. To locate the FTE, the handle provided in the instruction is used, and to locate the DTE, a device index in the FTE is used.

If the adapter function has already been registered for address translation, then an exception condition is provided, STEP 826. If not, then a determination is made as to whether the DMA address space that is specified is valid (i.e., is it an address space for which a DTE has been enabled), INQUIRY 828. If not, then an exception condition is provided, STEP 830. If all the checks are successful, then the translation parameters are placed in the device table entry and optionally, in the corresponding function table entry (or other designated location), STEP 832. For instance, the PCI function parameters relevant to I/O address translation are copied from the function information block and placed in the DTE/FTE. These parameters include, for instance, the PCI base address, the PCI address limit, the I/O address translation pointer, the address translation format and the page size. This operation enables DMA accesses to the specified DMA address space. It enables I/O address translation for the adapter function.

Another operation control that may be specified by the Modify PCI Function Controls instruction is an unregister I/O address translation parameters operation, an example of which is described with reference to FIG. 9. With this operation, the function parameters relevant to I/O address translation are reset to zeros. This operation disables DMA accesses to the specified DMA address space and causes a purge of I/O translation lookaside buffer entries for that DMA address space. It disables address translation.

Figure 9:
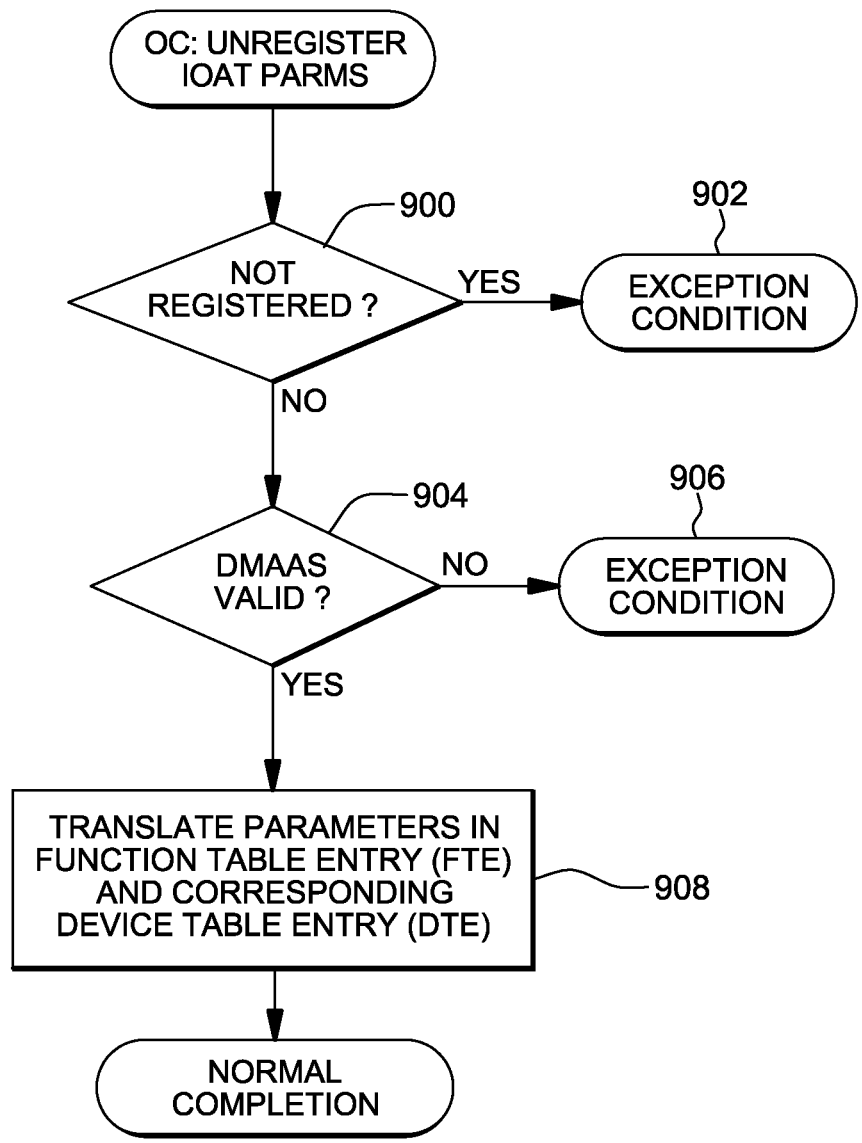
FIG. 9 depicts one embodiment of the logic associated with an unregister I/O address translation parameters operation that may be specified by the Modify PCI Function Controls instruction, in accordance with an aspect of the present invention.

Referring to FIG. 9, in one embodiment, a determination is made as to whether the I/O address translation parameters are not registered, INQUIRY 900. In one example, this determination is made by checking the values of the appropriate parameters in the DTE or FTE. If those fields are zero or some specified value, they are not registered. Therefore, an exception condition is provided, STEP 902. If they are registered, then a determination is made as to whether the DMA address space is valid, INQUIRY 904. If it is invalid, then an exception condition is provided, STEP 906. If the DMA address space is valid, then the translation parameters in the device table entry and optionally, in the corresponding function table entry are cleared, STEP 908.

Another operation control is a reregister I/O address translation parameters operation used in resizing of DMA address spaces. With this operation, the PCI function parameters relevant to I/O address translation are replaced with the appropriate parameters of the FIB. These parameters include, for instance, the PCI address limit; and I/O address translation pointer; the format; and page size, which are provided as operands from the FIB. Implied operands are also the currently registered PCI base address from the device table entry or function table entry, and the ending DMA address.

Figure 10:
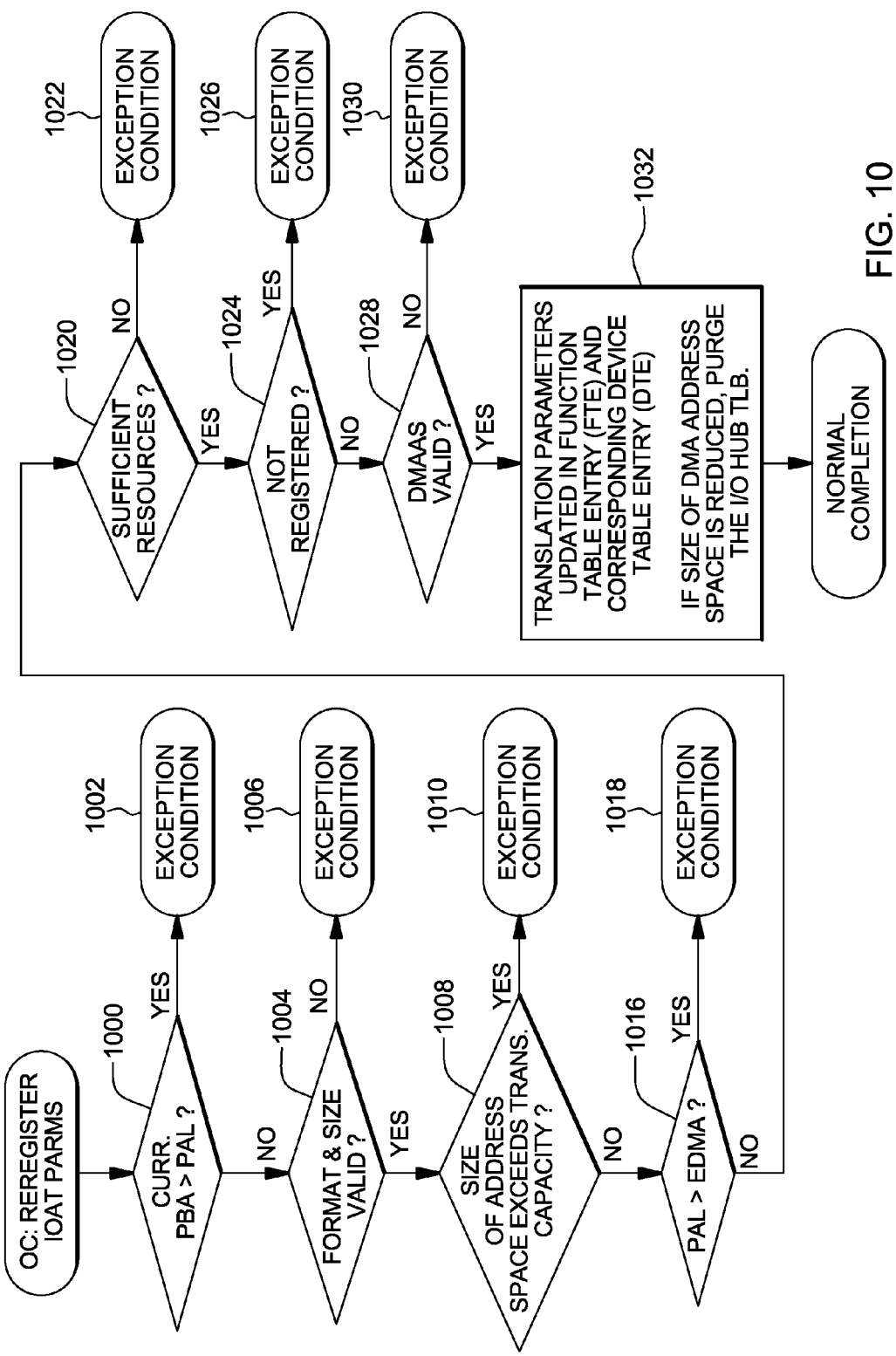
FIG. 10 depicts one embodiment of the logic associated with a reregister I/O address translation parameters operation that may be specified by the Modify PCI Function Controls instruction, in accordance with an aspect of the present invention.

One embodiment of the logic associated with this operation is described with reference to FIG. 10. Initially, a determination is made as to whether the current base address from the function table entry is greater than the PCI address limit specified in the function information block, INQUIRY 1000. If it is, then an exception condition is provided, STEP 1002. If not, then a determination is made as to whether the translation format and size are valid, INQUIRY 1004. If not, then an exception condition is provided, STEP 1006. If the format of the address translation tables and size of the page (or other unit of memory) are valid, then a further determination is made as to whether the size of the address space exceeds the translation capacity, INQUIRY 1008. Should the address space size exceed translation capacity, then an exception condition is provided, STEP 1010. If not, then a determination is made as to whether the address limit is greater than the ending DMA address, INQUIRY 1016. If so, then an exception condition is provided, STEP 1018. If not, then a determination is made as to whether there are sufficient resources, if any are needed, to perform this operation, INQUIRY 1020. If there are insufficient resources, then an exception condition is provided, STEP 1022.

If sufficient resources are available, then a determination is made as to whether the I/O address translation is registered for the adapter function, INQUIRY 1024. If not, then an exception condition is provided, STEP 1026. Otherwise, a determination is made as to whether the address space is valid, STEP 1028. If the address space is invalid, an exception condition is provided, STEP 1030. If the checks are successful, the translation parameters are updated in the device table entry and optionally, in the corresponding function table entry (or other designated location), STEP 1032. That is, the PCI function parameters relevant to I/O address translation are replaced with the operands from the function information block. These parameters include the PCI address limit, translation format and the I/O address translation pointer fields. The DMA address space and PCI base address fields remain unchanged. A request to change these fields would be ignored or an exception condition would be provided responsive to checking for these conditions. Further, in one embodiment, if the size of the DMA address space is reduced, the translation lookaside buffer in the I/O hub is purged. I/O translation remains enabled.

In one aspect of this operation, controls are included that dictate a particular ordering of updates related to reregistering the address translation parameters. For instance, if the number of levels of translation is increased (i.e., a higher level translation table is to be used), then the input/output address translation pointer is to be changed prior to the PCI address limit and checks are included to ensure this. Further, if the number of levels decreases, then checks are provided to ensure the limit is updated prior to the address translation pointer. Then, a purge of any related translation lookaside buffer is performed.

Figure 11:
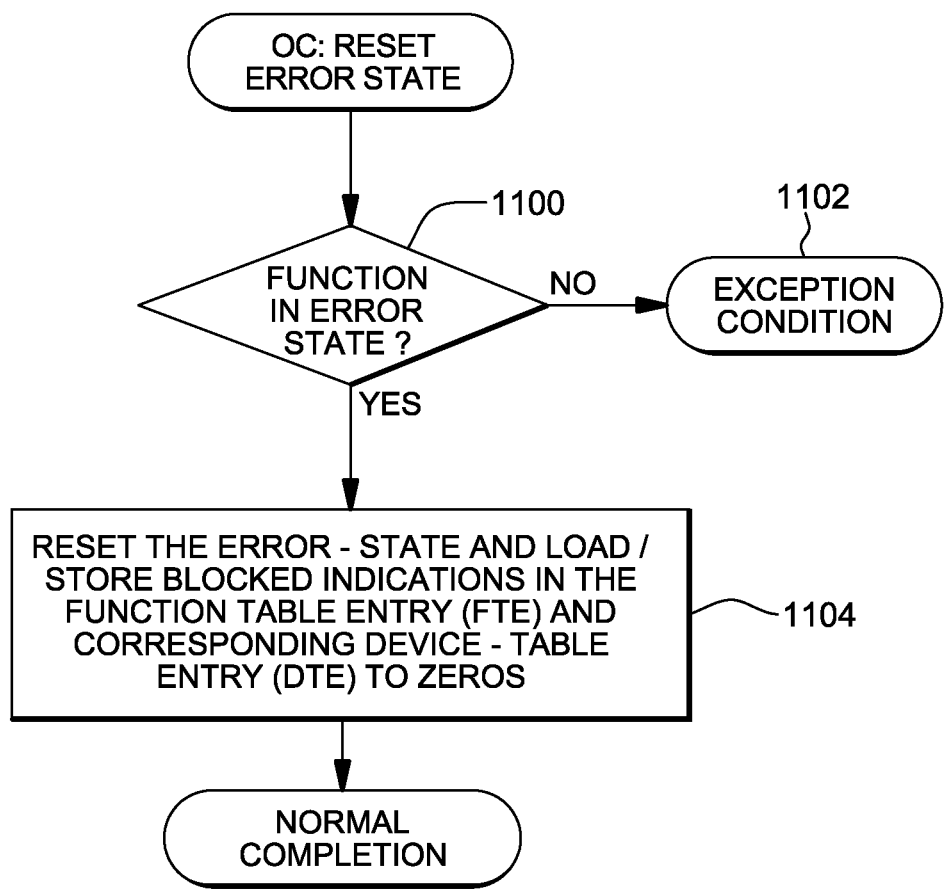
FIG. 11 depicts one embodiment of the logic associated with a reset error state indication operation that may be specified by the Modify PCI Function Controls instruction, in accordance with an aspect of the present invention.

A further operation that can be performed is a reset error state indication operation used to reset error conditions, an example of which is described with reference to FIG. 11. With this operation, the error state and load/store blocked indications are set to zero, thus allowing the I/O hub to process subsequent DMAs and MSIs received from the adapter. In one embodiment, a determination is made as to whether the adapter function is in an error state, as indicated by the value of this parameter, INQUIRY 1100. If not, then an exception condition is provided, STEP 1102. Otherwise, the error state and load/store blocked indications in the function table entry and corresponding device table entry are reset to zeros, STEP 1104.

Figure 12:
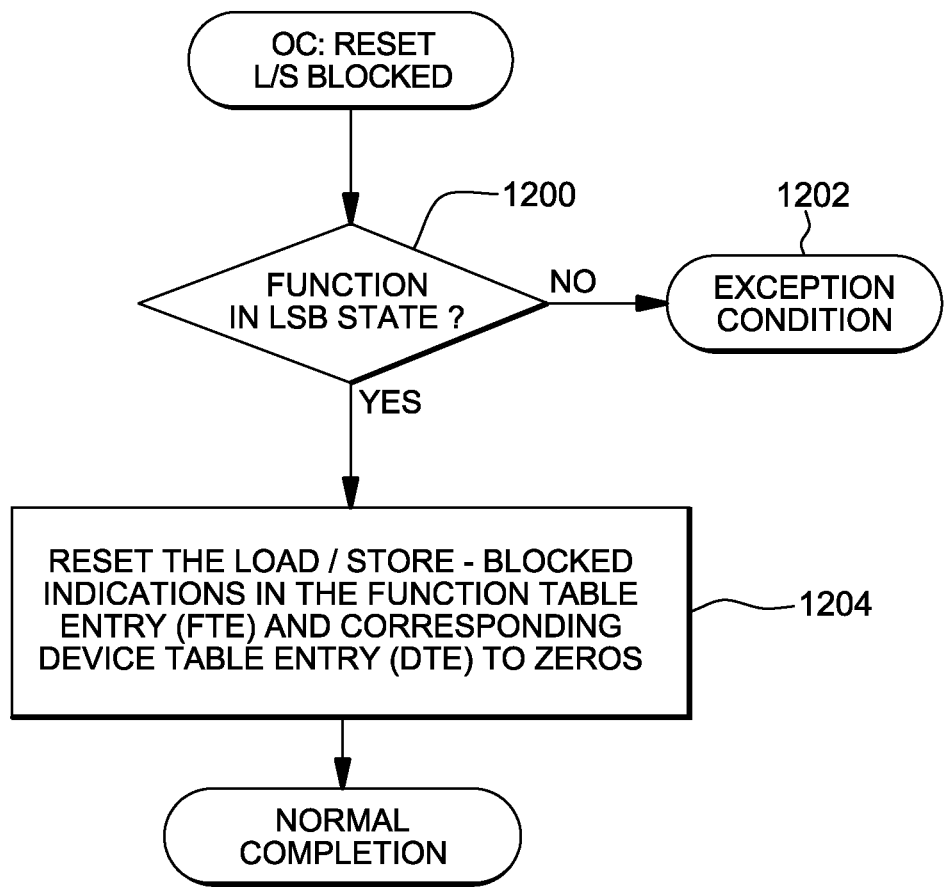
FIG. 12 depicts one embodiment of the logic associated with a reset load/store blocked indication operation that may be specified by the Modify PCI Function Controls instruction, in accordance with an aspect of the present invention.

Another operation control that may be specified is a reset load/store blocked indication operation. With this operation the load/store blocked indication is set to zero, thus, allowing PCI Load/Store instructions to be issued to this adapter. One embodiment of the logic associated with this operation is described with reference to FIG. 12. Initially, a determination is made as to whether the function is in a load/store blocked state, as indicated by the value in this parameter, INQUIRY 1200. If not, then an exception condition is provided, STEP 1202. Otherwise, the load/store blocked indication in the function table entry and corresponding device table entry are reset to zeros, STEP 1204.

Another operation that may be specified by the operation control is a set PCI function measurement parameters operation used for maintaining measurements. With this operation, the PCI function parameters relevant to PCI function measurement are set from the function information block. If the function measurement block address field contains a non-zero address, then PCI function measurement is enabled. However, if the function measurement block address field contains zeros, then PCI function measurement is disabled. In one example, the operands for this operation obtained from the function information block include the function measurement block address and function measurement block key. Implied operands include the number of DMA address spaces, which is obtained from the function table entry.

Figure 13:
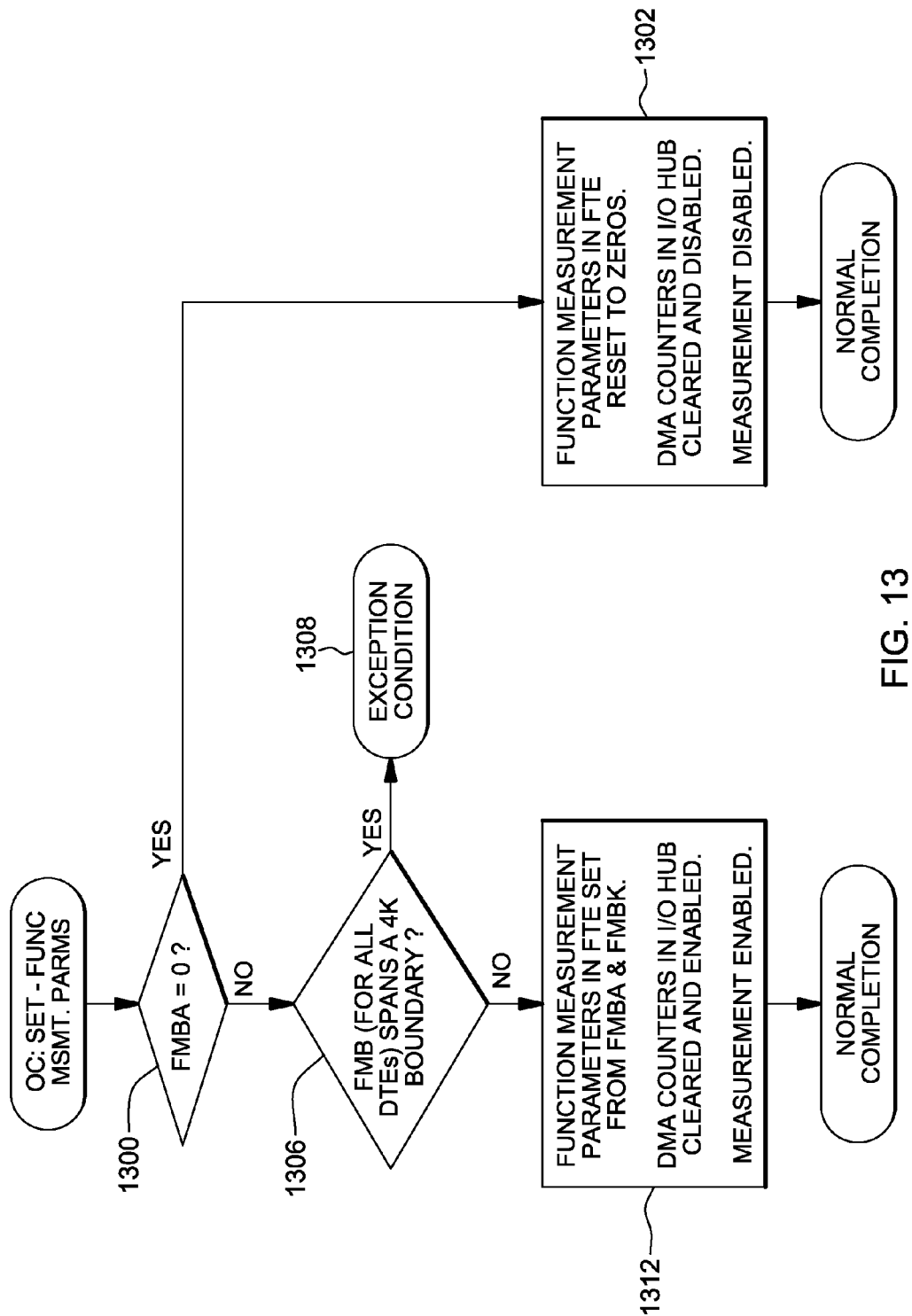
FIG. 13 depicts one embodiment of the logic of a set PCI functions measurement parameters operation that may be specified by the Modify PCI Function Controls instruction, in accordance with an aspect of the present invention.

One embodiment of the logic associated with this operation is described with reference to FIG. 13. In one example, a determination is made as to whether the function measurement block address is equal to zero, INQUIRY 1300. If so, then the function measurement parameters in the function table entry are reset to zero, STEP 1302. Further, the DMA counters in the I/O hub are cleared and disabled, and measurement is disabled.

Returning to INQUIRY 1300, if the function measurement block address is not zero, then a further determination is made as to whether the function measurement block for all device table entries spans a 4K boundary, INQUIRY 1306. In one example, 4K block spanning is determined by adding the function measurement block address, fixed function measurement block size plus DMA address space specific extensions for each DMA address space. If the function measurement block spans a 4K boundary, then an exception condition is provided, STEP 1308. Otherwise, the function measurement parameters in the function table entry (e.g., FMBA and FMBK) are set from the function measurement block address and function measurement block key parameters of the function information block, STEP 1312. Further, the DMA counters in the I/O hub are cleared and enabled, and measurement is enabled.

A yet further operation that may be specified by an operation control of the Modify PCI Function Controls instruction is a set interception control operation used to control interception of instructions by a host operating system. With this operation, the PCI function parameters relative to interception control are set from the interruption control field of the function information block. This operation control is considered to be reserved when issued by a pageable storage mode guest.

Figure 14:
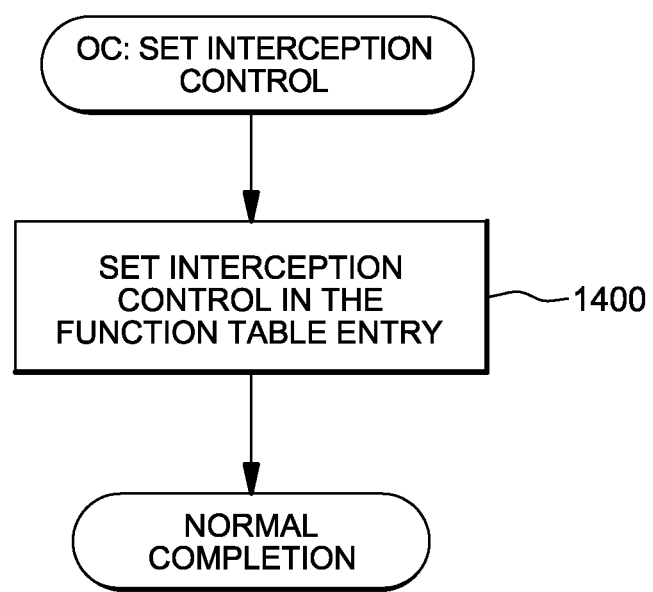
FIG. 14 depicts one embodiment of a set interception control operation that may be specified by the Modify PCI Function Controls instruction, in accordance with an aspect of the present invention.

One embodiment of the logic of the set interception control operation is described with reference to FIG. 14. In one example, the operand is the interception control from the function information block. Responsive to specifying this operation, the interception control in the function table entry is set to the interception control from the function information block, STEP 1400.

As described above, using the Modify PCI Function Controls instruction, selected program-modifiable controls of the specified PCI function are replaced with values from the FIB. This enables the operating system to request changes to the DTE (and FTE) without giving the operating system direct access to the DTE. The firmware performs the selected operations and is able to provide control using various validity checks, as described above. The checks are specific to the operation being requested.

In addition to the Modify PCI Function Controls instruction, a Store PCI Function Controls instruction is available to the configuration. This instruction is used to store the current contents of the function information block in a location designated by the operating system. One embodiment of the Store PCI Function Controls instruction is described with reference to FIGS. 15A-15C.

Figure 15A:
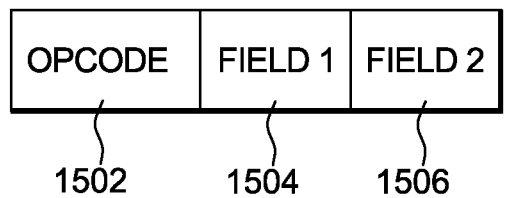
FIG. 15A depicts one embodiment of a Store PCI Function Controls instruction used in accordance with an aspect of the present invention.

Referring to FIG. 15A, a Store PCI Function Controls instruction 1500 includes, for instance, an op code 1502 indicating the Store PCI Function Controls instruction; a first field 1504 specifying a location at which various information is included regarding the adapter function for which the store is being performed; and a second field 1506 specifying a location at which a logical address of a PCI function information block is stored.

Figure 15B:
FIG. 15B depicts one embodiment of a field used by the Store PCI Function Controls instruction of FIG. 15A, in accordance with an aspect of the present invention.

In one embodiment, Field 1 designates a general register that includes various information. As shown in FIG. 15B, the contents of the register include, for instance, a function handle 1510 that identifies the handle of the adapter function for which the store instruction is being performed; status 1512 which provides status regarding the instruction when the instruction completes with a predefined code; and an address space 1514 designating an address space in system memory associated with the adapter function designated by the function handle.

Figure 15C:
FIG. 15C depicts one embodiment of another field used by the Store PCI Function Controls instruction of FIG. 15A, in accordance with an aspect of the present invention.

In one example, as shown in FIG. 15C, Field 2 designates a logical address 1516 of a PCI function information block, which includes information regarding an adapter function, and is to be copied to this specified location in accordance with an aspect of the present invention.

One embodiment of the logic associated with the Store PCI Function Controls instruction is described with reference to FIGS. 16A-16B. In one example, the operands for this instruction include the enabled function handle, the DMA address space identifier, and an address of a result buffer (e.g., the function information block in user storage). In one example, it is the operating system that issues this instruction which is performed by the processor.

Figure 16A:
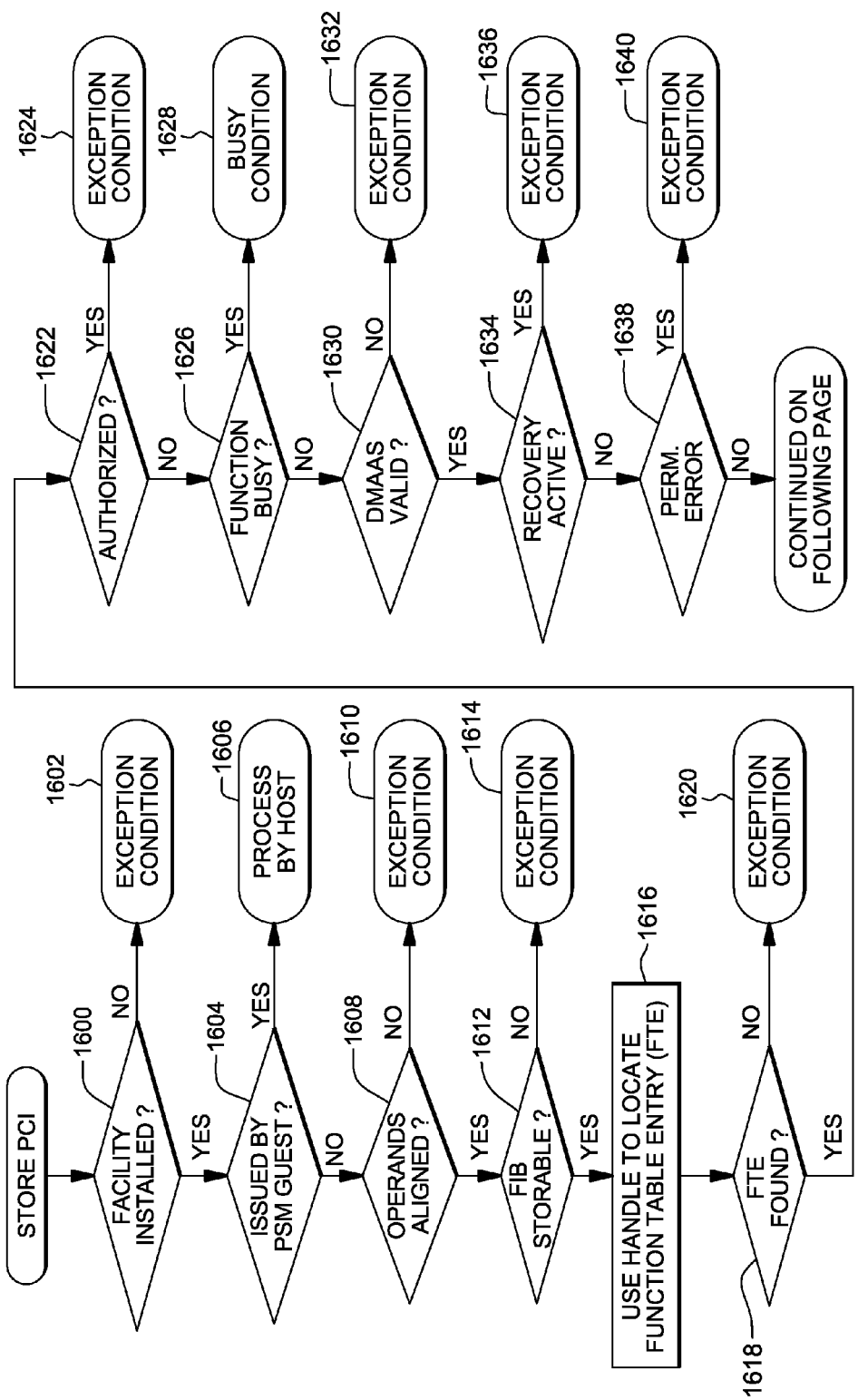
FIGS. 16A-16B depict one embodiment of the logic associated with a Store PCI Function Controls instruction used in accordance with an aspect of the present invention.
Figure 16B:
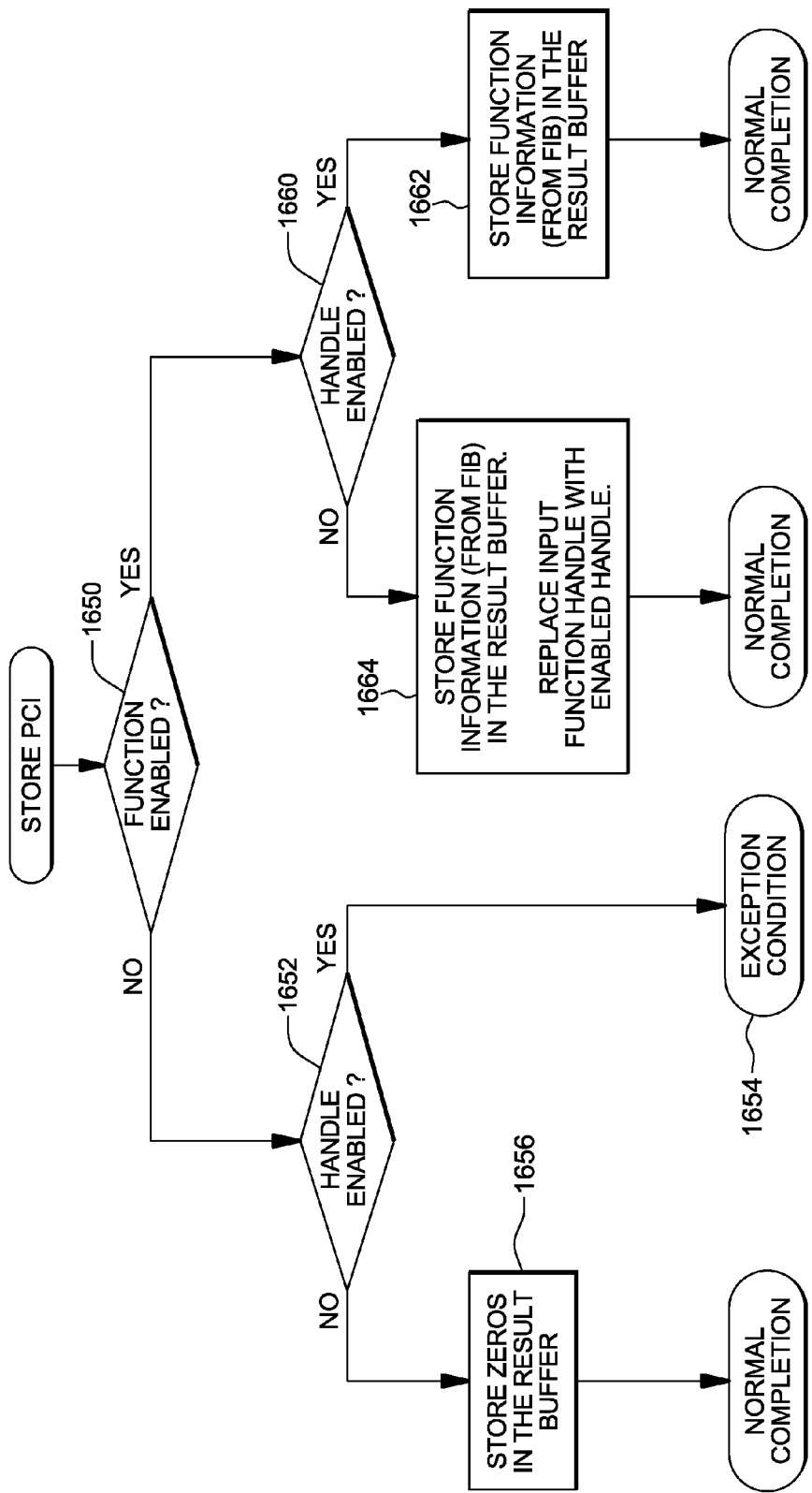

Referring to FIG. 16A, initially, a determination is made as to whether the facility allowing for a Store PCI Function Controls instruction is installed, INQUIRY 1600. This determination is made by, for instance, checking an indicator stored in, for instance, a control block. If the facility is not installed, an exception condition is provided, STEP 1602. Otherwise, a determination is made as to whether the instruction was issued by a pageable storage mode guest (or other guest), INQUIRY 1604. If so, the host operating system will emulate the operation for that guest, STEP 1606.

Otherwise, a determination is made as to whether the operands are aligned, INQUIRY 1608. For instance, a determination is made as to whether the address to which the function information block will be stored is on a double word boundary. In one example, this is optional. If the operands are not aligned, then an exception condition is provided, STEP 1610. Otherwise, a determination is made as to whether the function information block is storable, INQUIRY 1612. That is, will it fit in the result buffer. If not, then an exception condition is provided, STEP 1614. Otherwise, the handle is used to locate a function table entry, STEP 1616. That is, at least a portion of the handle is used as an index into the function table to locate the function table entry corresponding to the adapter function for which the store is being performed.

A determination is made as to whether the function table entry was found, INQUIRY 1618. If not, then an exception condition is provided, STEP 1620. Otherwise, if the configuration issuing the instruction is a guest, a determination is made as to whether the function is configured for use by a guest, INQUIRY 1622. If it is not authorized, an exception condition is provided, STEP 1624. Otherwise, a determination is made as to whether the function is busy, INQUIRY 1626. This determination is made by checking the busy indicator in the function table entry. If the function is busy, then a busy condition is provided, STEP 1628. With the busy condition, the instruction can be retried, instead of dropped.

If the function is not busy, then a further determination is made as to whether the address space is valid, INQUIRY 1630. If the address space is invalid, then an exception condition is provided, STEP 1632. However, if the address space is valid, then a determination is made as to whether recovery is active for this adapter function, INQUIRY 1634. If recovery is active, then an exception condition is provided, STEP 1636. If recovery is not active, then a further determination is made as to whether there has been a permanent error, INQUIRY 1638. If there is a permanent error, then an exception condition is provided, STEP 1640. Otherwise, processing continues with a determination as to whether the function is enabled, INQUIRY 1650 (FIG. 16B).

In one example, this determination is made by checking the enable indicator in the function table entry. If the function is not enabled, then a determination is made as to whether the handle is enabled, INQUIRY 1652. In one embodiment, this determination is made by checking the enable indicator in the handle. If the handle is enabled but the function is not enabled, then an exception condition is provided, STEP 1654. However, if neither the function nor the handle are enabled, then zeros are stored in the result buffer, STEP 1656.

Returning to INQUIRY 1650, if the function is enabled, then again a determination is made as to whether the handle is enabled, INQUIRY 1660. If the function and handle are enabled, then the function information from the FIB is stored in a location designated by the operating system, referred to herein as the result buffer, STEP 1662.

If, however, the function is enabled but the handle is not enabled, then the function information from the FIB is stored in the result buffer and the input function handle is replaced with the enabled handle, STEP 1664. This completes processing of the Store PCI Function Controls instruction.

As described above, a Store PCI Function Controls instruction is provided that enables a copy of the function information block to be placed in a location designated by the operating system.

The Modify and Store instructions enable the operating system to request certain action, such as setting various operational parameters for an adapter function (Modify instruction) and/or obtaining a copy of the function information block containing the characteristics of the adapter function (Store). Responsive to the request of the operating system to execute these instructions, the firmware executes the instructions and ensures certain checks are made prior to completing the requested operation providing certain controls over the operating system.

In accordance with an aspect of the present invention, a mechanism is provided in which host data structures are (a) established before the PCI device can communicate with the system, (b) updated dynamically during PCI accesses, and (c) disestablished when PCI communication is to be terminated. These structures include, for instance:

Boundaries limiting the scope of main storage accessible by the PCI function;

I/O address translation tables, used by a PCI function's direct memory access (DMA) protocol;

Interruption bit vectors and summary bit vectors, used to signal the progress (including completion) of an I/O operation;

Structures used in the performance measurement of the PCI function; and

Structures used in the interpretive execution of other PCI instructions.

In one example, the mechanism includes the Modify PCI Function Controls instruction.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, entitled "Translation Of Input/Output Addresses To Memory Addresses," Craddock et al., (POU920090029US1); U.S. Ser. No. 12/821,171, entitled "Runtime Determination Of Translation Formats For Adapter Functions," Craddock et al., (POU920100007US1); U.S. Ser. No. 12/821,172, entitled "Resizing Address Spaces Concurrent To Accessing The Address Spaces," Craddock et al., (POU920100009US1); U.S. Ser. No. 12/821,174, entitled "Multiple Address Spaces Per Adapter," Craddock et al., (POU920100010US1); U.S. Ser. No. 12/821,175, entitled "Converting A Message Signaled Interruption Into An I/O Adapter Event Notification," Craddock et al., (POU920100014US1); U.S. Ser. No. 12/821,177, entitled "Converting A Message Signaled Interruption Into An I/O Adapter Event Notification To A Guest Operating System," Brice et al., (POU920100015US1); U.S. Ser. No. 12/821,178, entitled "Identification Of Types Of Sources Of Adapter Interruptions," Craddock et al., (POU920100016US1); U.S. Ser. No. 12/821,179, entitled "Controlling A Rate At Which Adapter Interruption Requests Are Processed," Belmar et al., (POU920100017US1); U.S. Ser. No. 12/821,182, entitled "Load Instruction for Communicating with Adapters," Craddock et al., (POU920100019US1); U.S. Ser. No. 12/821,184, entitled "Controlling Access By A Configuration To An Adapter Function," Craddock et al., (POU920100020US1); U.S. Ser. No. 12/821,185, entitled "Discovery By Operating System Of Information Relating To Adapter Functions Accessible To The Operating System," Coneski et al., (POU920100021US1); U.S. Ser. No. 12/821,187, entitled "Enable/Disable Adapters Of A Computing Environment," Coneski et al., (POU920100022US1); U.S. Ser. No. 12/821,190, entitled "Guest Access To Address Spaces Of Adapter," Craddock et al., (POU920100023US1); U.S. Ser. No. 12/821,191, entitled "Managing Processing Associated With Hardware Events," Coneski et al., (POU920100025US1); U.S. Ser. No. 12/821,192, entitled "Operating System Notification Of Actions To Be Taken Responsive To Adapter Events," Craddock et al., (POU920100026US1); U.S. Ser. No. 12/821,193, entitled "Measurement Facility For Adapter Functions," Brice et al., (POU920100027US1); U.S. Ser. No. 12/821,194, entitled "Store/Store Block Instructions for Communicating with Adapters," Craddock et al., (POU920100162US1); U.S. Ser. No. 12/821,224, entitled "Associating Input/Output Device Requests With Memory Associated With A Logical Partition," Craddock et al., (POU920100045US1); U.S. Ser. No. 12/821,247, entitled "Scalable I/O Adapter Function Level Error Detection, Isolation, And Reporting," Craddock et al., (POU920100044US1); U.S. Ser. No. 12/821,256, entitled "Switch Failover Control In A Multiprocessor Computer System," Bayer et al., (POU920100042US1); U.S. Ser. No. 12/821,242, entitled "A System And Method For Downbound I/O Expansion Request And Response Processing In A PCIe Architecture," Gregg et al., (POU920100040US1); U.S. Ser. No. 12/821,243, entitled "Upbound Input/Output Expansion Request And Response Processing In A PCIe Architecture," Gregg et al., (POU920100039US1); U.S. Ser. No. 12/821,245, entitled "A System And Method For Routing I/O Expansion Requests And Responses In A PCIe Architecture," Lais et al. (POU920100038US1); U.S. Ser. No. 12/821,239, entitled "Input/Output (I/O) Expansion Response Processing In A Peripheral Component Interconnect Express (PCIe) Environment," Gregg et al., (POU920100037US1); U.S. Ser. No. 12/821,271, entitled "Memory Error Isolation And Recovery In A Multiprocessor Computer System," Check et al., (POU920100041US1); and U.S. Ser. No. 12/821,248, entitled "Connected Input/Output Hub Management," Bayer et al., (POU920100036US1), each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 17:
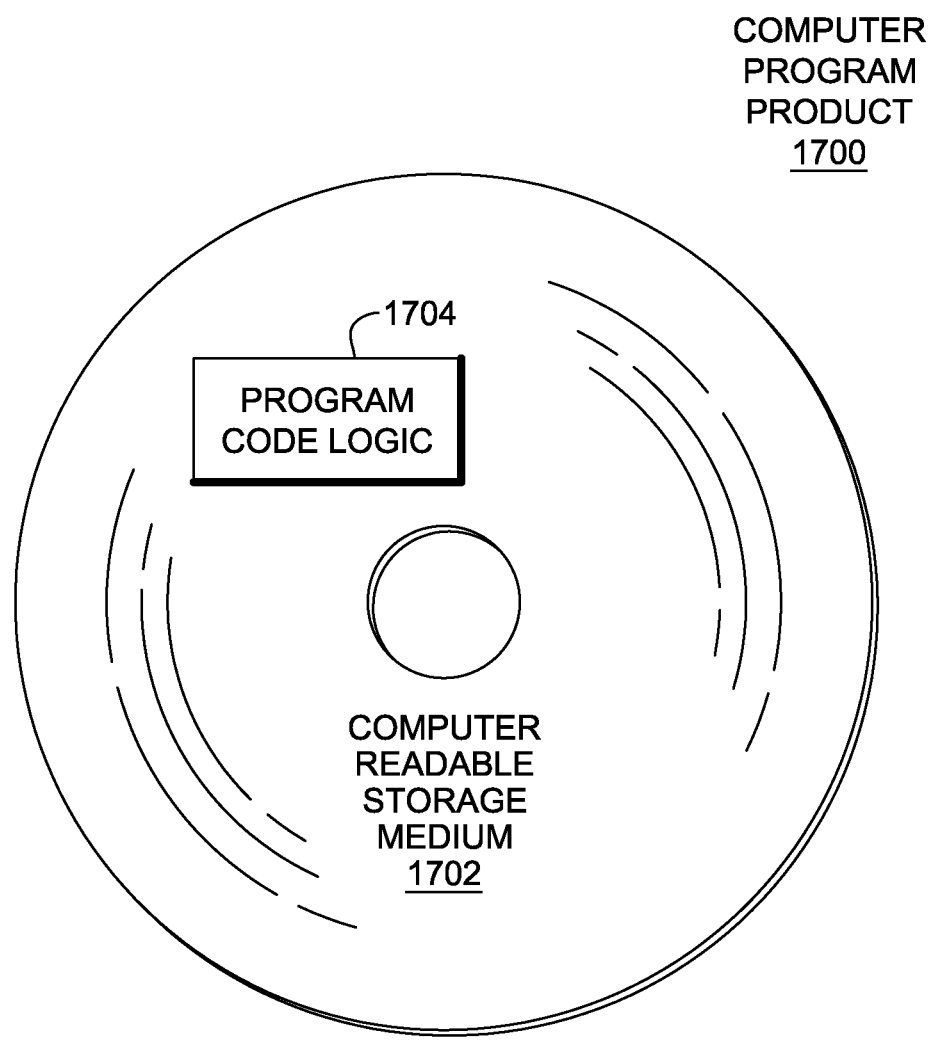
FIG. 17 depicts one embodiment of a computer program product incorporating one or more aspects of the present invention.

Referring now to FIG. 17, in one example, a computer program product 1700 includes, for instance, one or more computer readable storage media 1702 to store computer readable program code means or logic 1704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, although tables are described, any data structure can be used and the term table is to include all such data structures. Yet further, although the adapters are PCI based, one or more aspects of the present invention are usable with other adapters or other I/O components. Adapter and PCI adapter are just examples. Moreover, the FTE, DTE, FIB and/or other structures may include more, less or different information. Further, the checks performed in the instructions, operations and/or commands can be performed in a differing order; and/or more, less or different checks may be used. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 18:
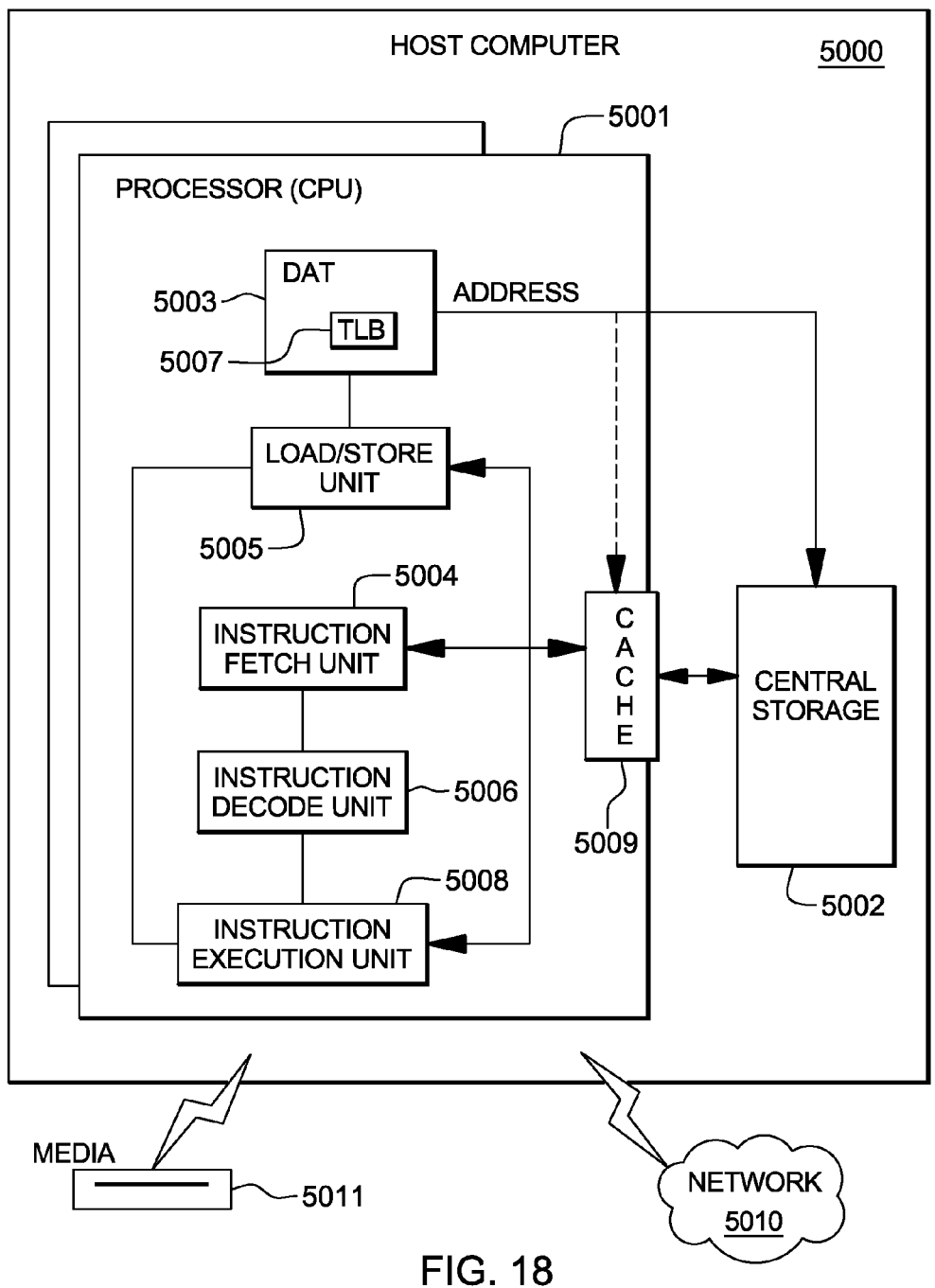
FIG. 18 depicts one embodiment of a host computer system to incorporate and use one or more aspects of the present invention.

Referring to FIG. 18, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 18, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 19:
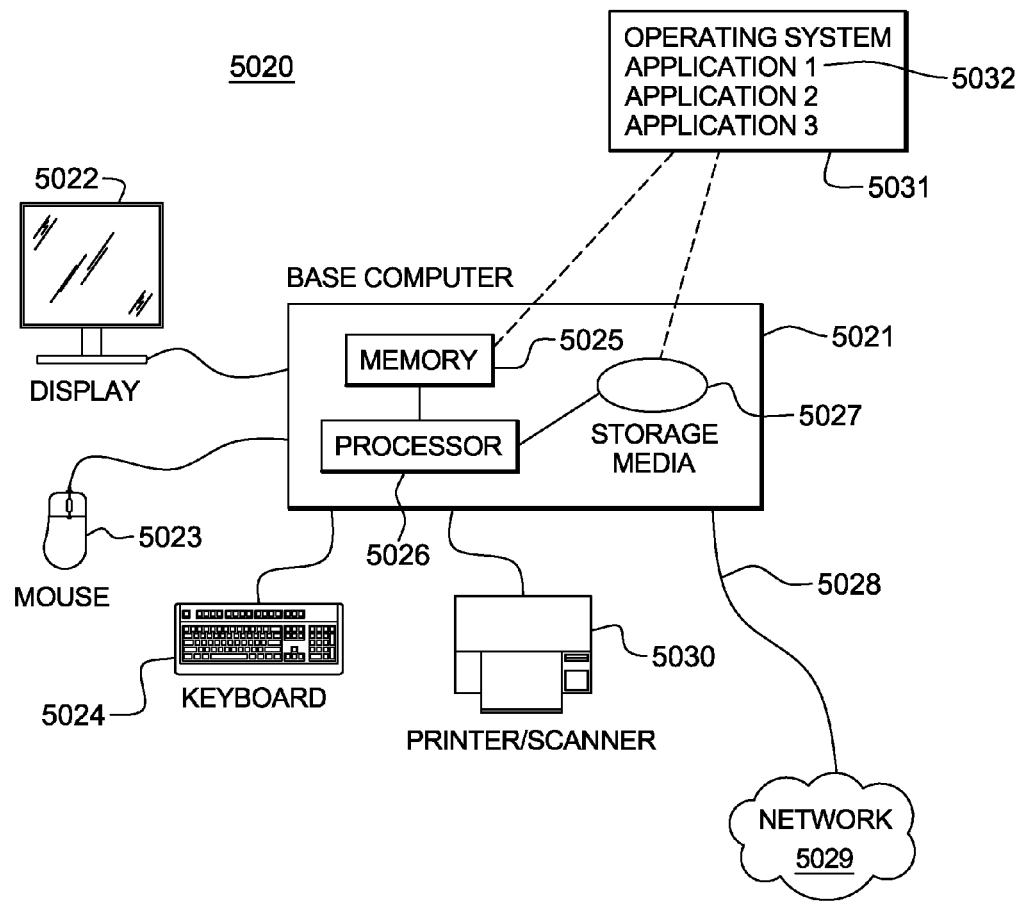
FIG. 19 depicts a further example of a computer system to incorporate and use one or more aspects of the present invention.

FIG. 19 illustrates a representative workstation or server hardware system in which the present invention may be practiced. The system 5020 of FIG. 19 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 20:
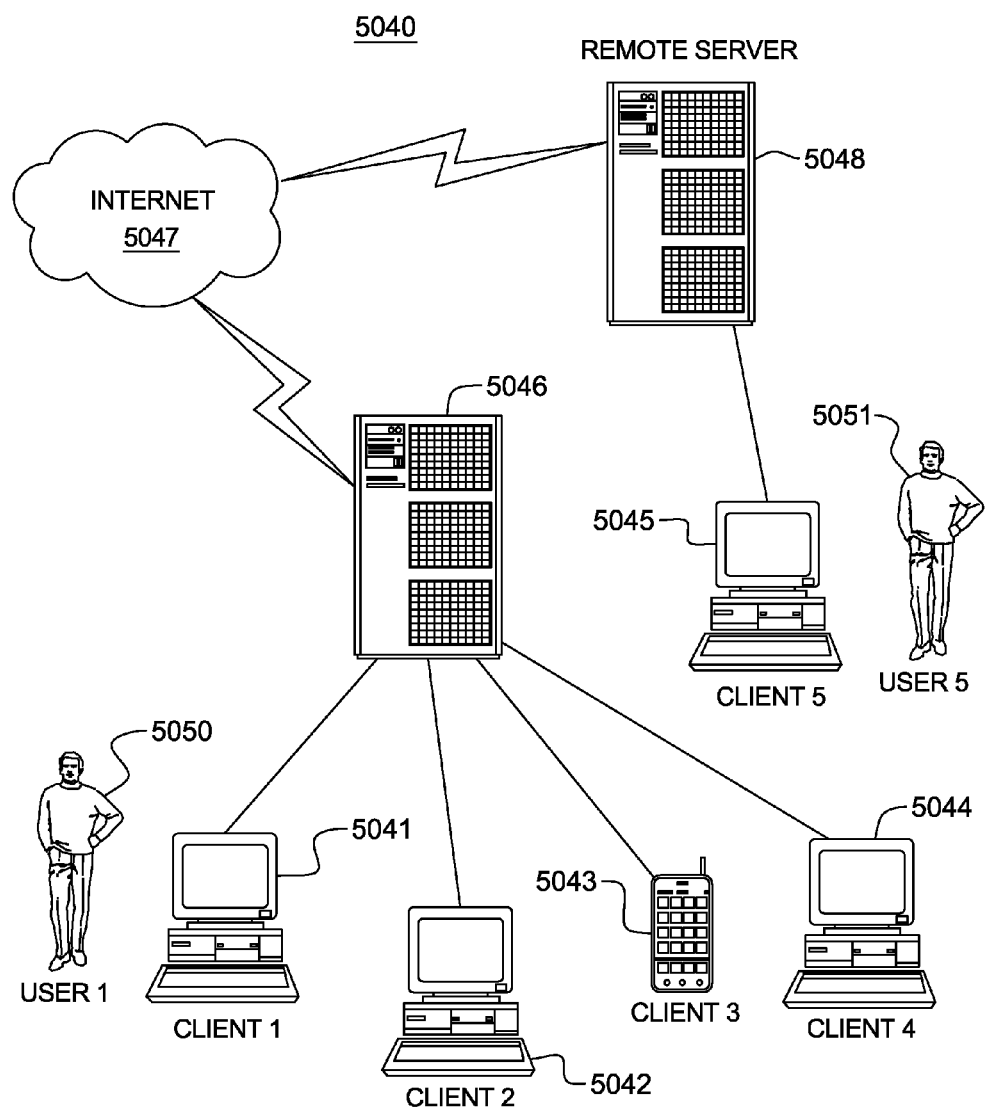
FIG. 20 depicts another example of a computer system comprising a computer network to incorporate and use one or more aspects of the present invention.

FIG. 20 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 20, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 19 and FIG. 20, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 21:
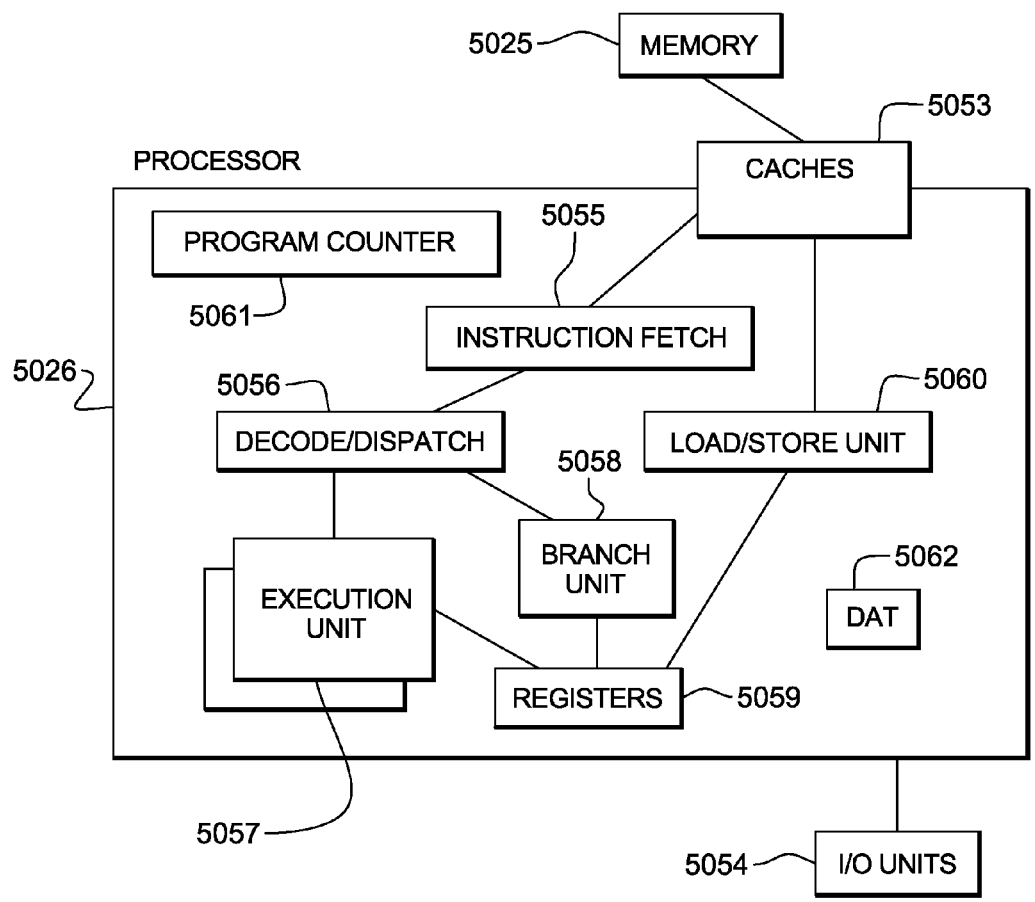
FIG. 21 depicts one embodiment of various elements of a computer system to incorporate and use one or more aspects of the present invention.

Referring to FIG. 21, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 22A:
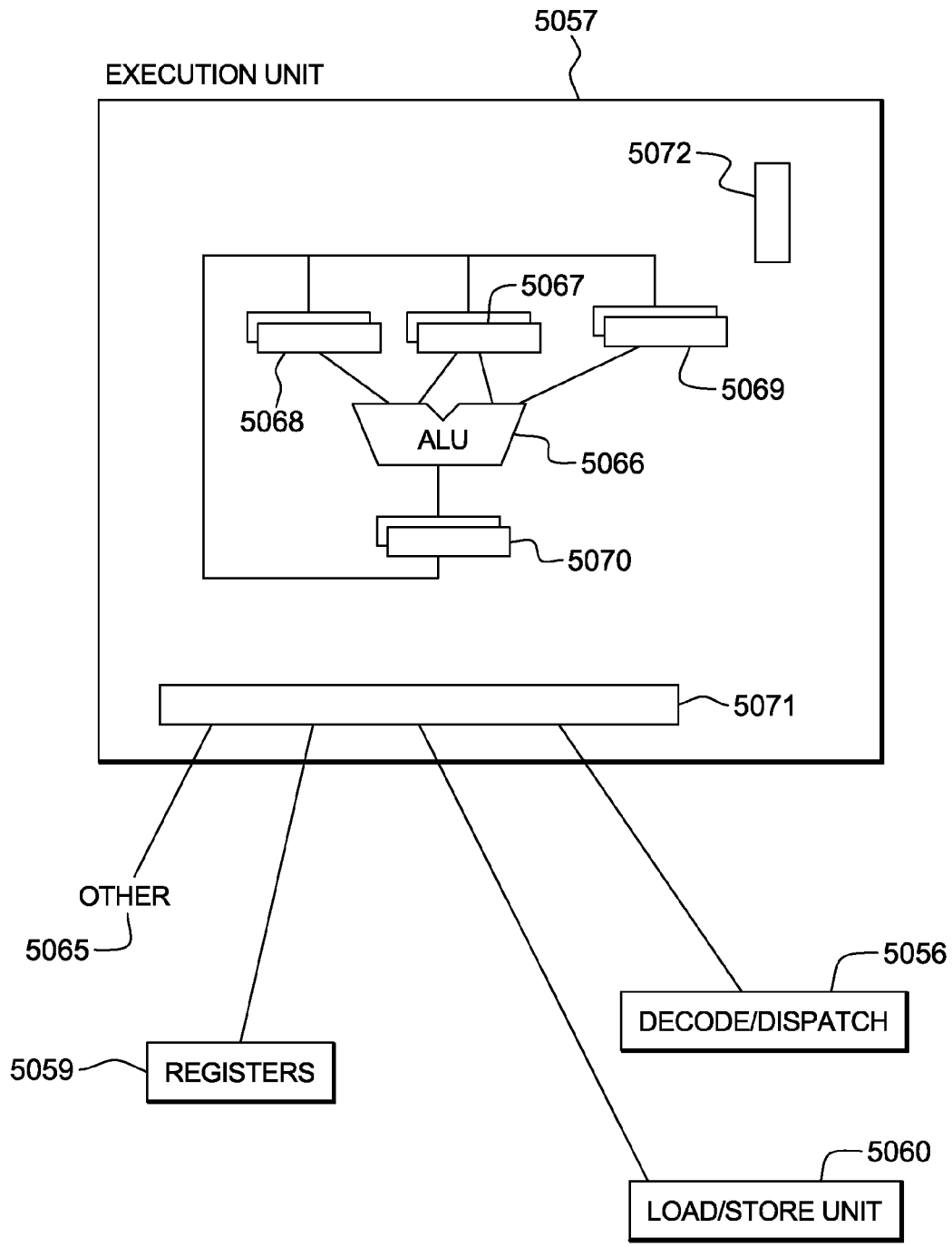
FIG. 22A depicts one embodiment of the execution unit of the computer system of FIG. 21 to incorporate and use one or more aspects of the present invention.

A processor 5026 typically has one or more units 5057, 5058, 5060 for executing the function of the instruction. Referring to FIG. 22A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 22B:
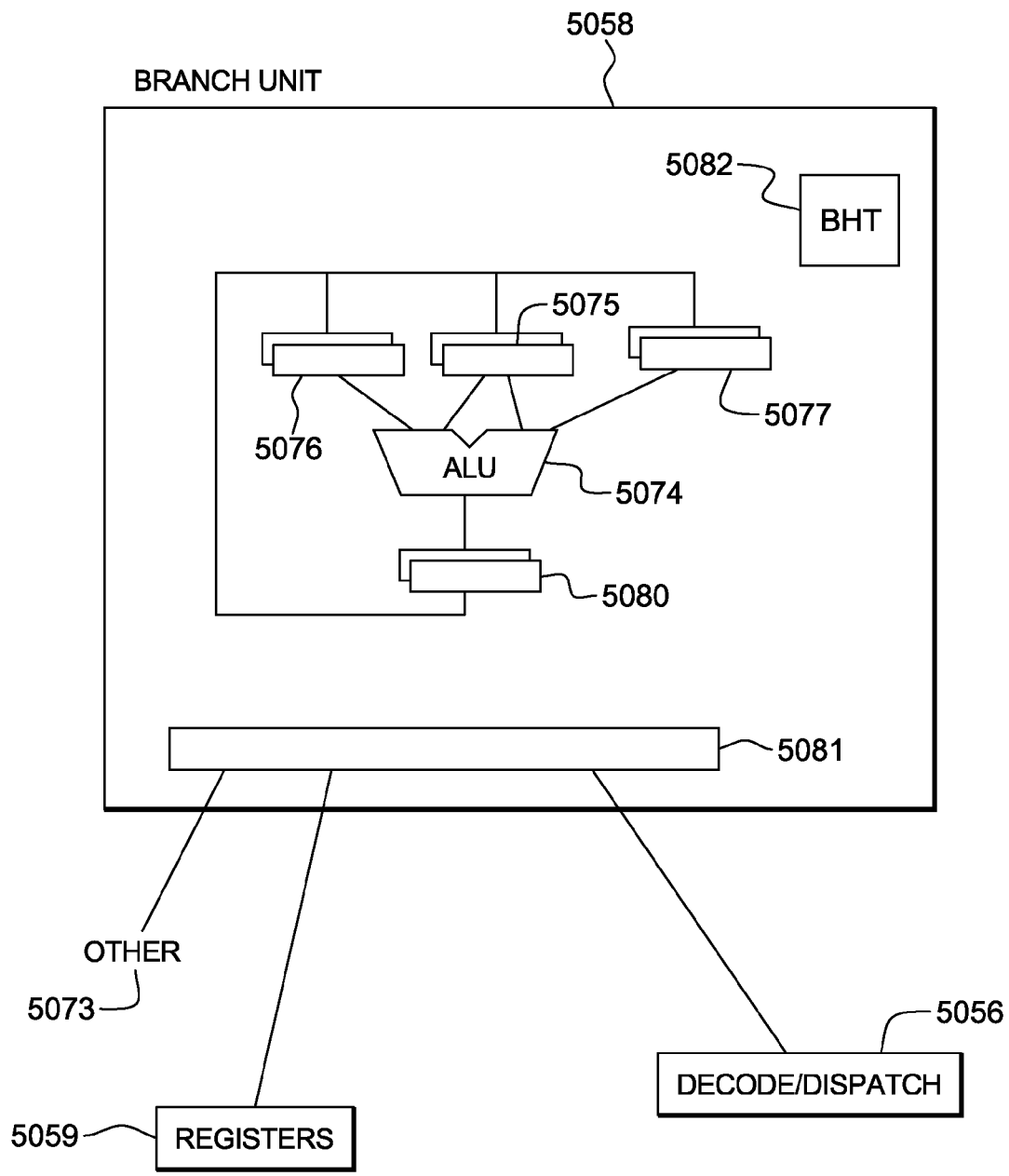
FIG. 22B depicts one embodiment of the branch unit of the computer system of FIG. 21 to incorporate and use one or more aspects of the present invention.

Referring to FIG. 22B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 22C:
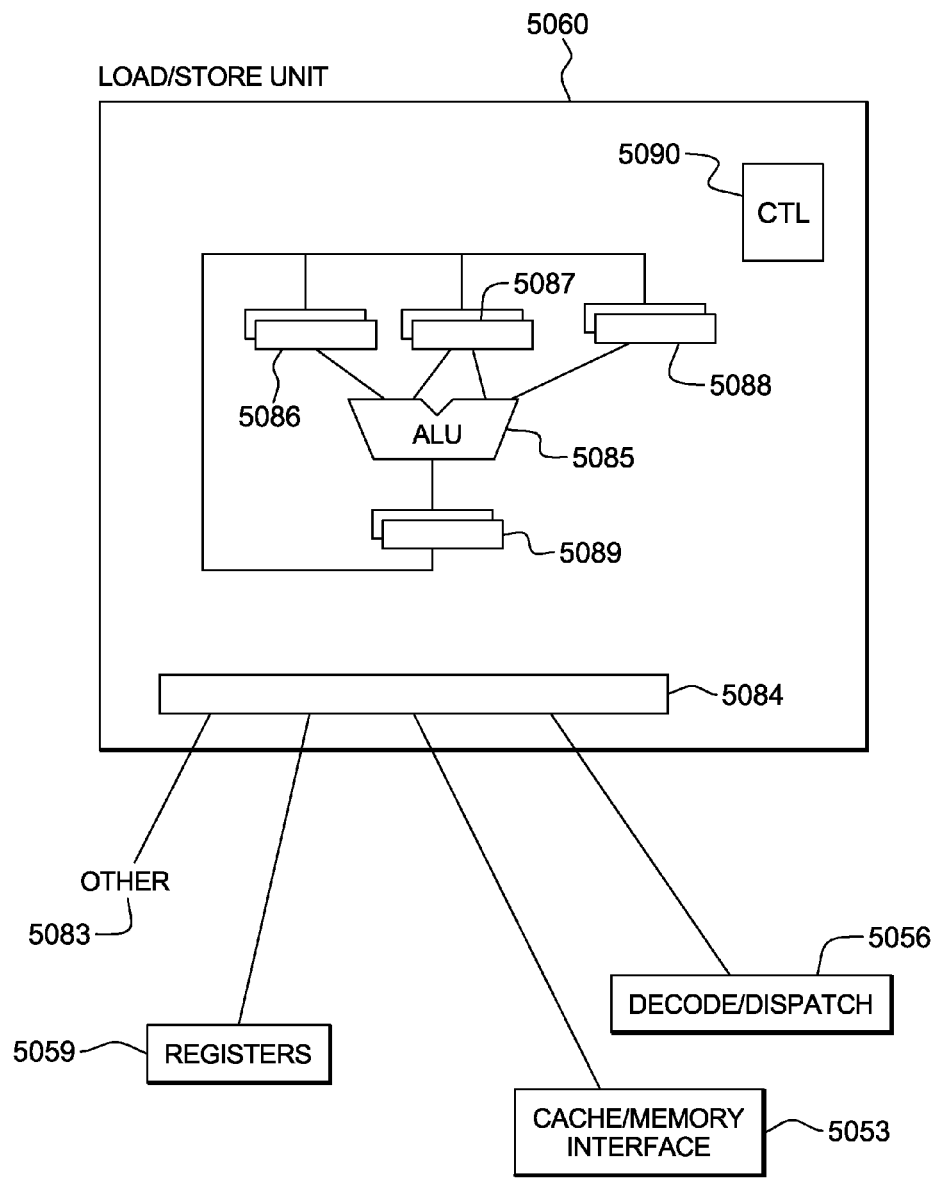
FIG. 22C depicts one embodiment of the load/store unit of the computer system of FIG. 21 to incorporate and use one or more aspects of the present invention.

Referring to FIG. 22C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 21) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 23:
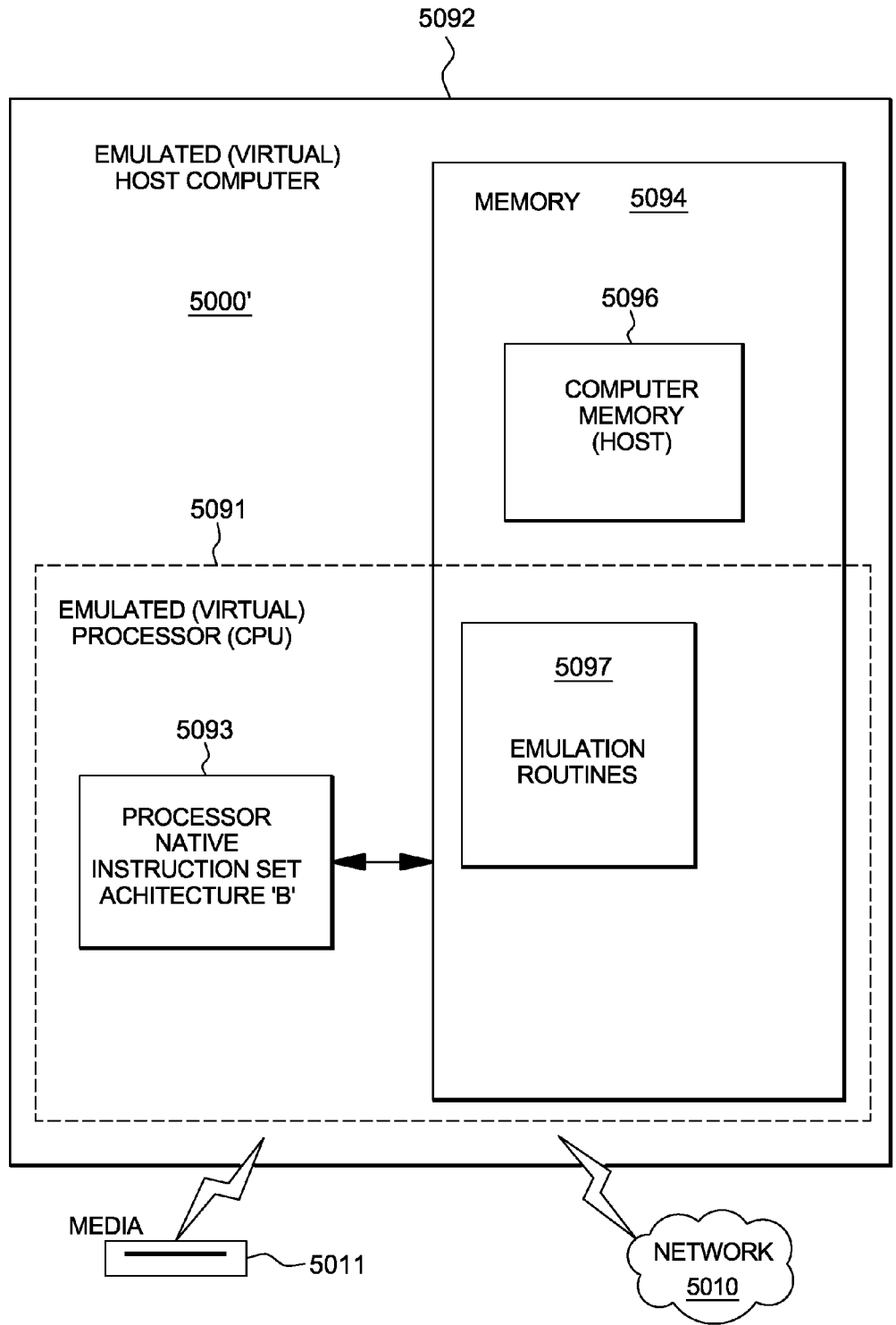
FIG. 23 depicts one embodiment of an emulated host computer system to incorporate and use one or more aspects of the present invention.

In FIG. 23, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for executing a machine instruction in a central processing unit, the computer program product comprising:
    a non-transitory computer readable storage medium readable by a processing circuit and storing instructions for execution by the processing circuit for performing a method comprising:
        obtaining a machine instruction for execution, the machine instruction being defined for computer execution according to a computer architecture, the machine instruction comprising:
            an opcode field identifying a modify function controls adapter instruction, the modify function controls adapter instruction configured to establish operational parameters for an adapter function, the operational parameters to be set for a particular operation to be performed for or on behalf of the adapter function, the particular operation to be selected from a plurality of operations the modify function controls adapter instruction is configured to perform, and wherein the particular operation to be performed in a particular execution of the modify function controls adapter instruction is specified in an operation control provided by a first field of the modify function controls adapter instruction, the first field being separate from the opcode field;
            the first field identifying a location, the contents of which include a function handle identifying a handle of the adapter function, a designation of an address space associated with the adapter function to which the particular operation applies, and the operation control specifying the particular operation to be performed for the adapter function, the operation control specifying one operation of the plurality of operations that can be selected; and
            a second field for identifying an address of a function information block to be used by the modify function controls adapter instruction; and
        executing the machine instruction, the executing comprising:
            determining a value of the operation control; and
            modifying, based on the operation control, a selected table entry that includes parameters associated with the adapter function, wherein the modifying comprises selectively updating one or more parameters of the selected table entry based on the value of the operation control and based on one or more checks that depend on the value of the operation control.

2. The computer program product of claim 1, wherein the instruction is issued by an operating system, and wherein the modifying comprises using information in the function information block to modify the one or more parameters, the function information block fetched from memory accessible to the operating system.

3. The computer program product of claim 2, wherein the table entry comprises a device table entry located in a hub coupled to the adapter function and the processor or another entry associated with the adapter function.

4. The computer program product of claim 3, wherein both the device table entry and the another entry are updated.

5. The computer program product of claim 2, wherein the operation control comprises registering adapter interruptions for the adapter function, and wherein the modifying comprises modifying one or more parameters specific to adapter interruptions, said one or more parameters comprising an address of an adapter function interruption vector for the adapter, an offset within the adapter function interruption vector, an address of an adapter interruption summary vector, an offset within the adapter interruption summary vector, a summary notification control and a number of interruptions supported by the adapter function.

6. The computer program product of claim 2, wherein the operation control comprises registering input/output address translation parameters, and wherein the modifying comprises modifying one or more parameters specific to address translation, said one or more parameters including a base address of the address space, a limit of the address space, a translation pointer that indicates a highest level address translation table to be used, a size of a unit of memory and an address translation format.

7. The computer program product of claim 2, wherein the operation comprises a reregister of address translation parameters, and wherein the modifying comprises modifying one or more parameters specific to reregistering address translation, the one or more parameters including a limit of the address space and an address translation pointer that indicates a highest level address translation table to be used, and wherein the modifying uses the one or more controls to indicate a particular ordering of updates related to reregistering the address translation parameters.

8. The computer program product of claim 7, wherein another address translation parameter comprises a base address of the address space, and wherein based on a request to modify the base address, the one or more controls are used to prevent the base address from being updated.

9. The computer program product of claim 2, wherein the operation control comprises setting adapter function measurement parameters, and wherein the modifying comprises modifying one or more parameters specific to adapter function measurement, the one or more parameters comprising a sample count, one or more instruction counts, and one or more direct memory access counts.

10. The computer program product of claim 1, wherein the operation control comprises a reset error state indication, and wherein the modifying comprises resetting one or more status indicators in the table entry.

11. The computer program product of claim 1, wherein the operation control comprises an unregistering of adapter function interruption, and wherein the modifying comprises resetting one or more parameters specific to adapter function interruptions, the one or more parameters including an address of an adapter interruption vector for the adapter function, an offset within the adapter interruption vector, an address of an adapter summary vector, an offset within the adapter interruption summary vector, a summary notification control, and a number of interruptions supported by the adapter function.

12. The computer program product of claim 1, wherein the operation control comprises an unregistering of input/output address translation, and wherein the modifying comprises resetting one or more parameters specific to address translation, the one or more parameters including a base address of the address space, a limit of the address space, an address translation pointer that indicates a highest level address translation table to be use, a size of a unit of memory and an address translation format.

13. A computer system for executing a machine instruction in a central processing unit, the computer system comprising:
 a memory; and
 a processor in communications with the memory, wherein the computer system is configured to perform a method, said method comprising:
  obtaining, by a processor, a machine instruction for execution, the machine instruction being defined for computer execution according to a computer architecture, the machine instruction comprising:
   an opcode field identifying a modify function controls adapter instruction, the modify function controls adapter instruction configured to establish operational parameters for an adapter function, the operational parameters to be set for a particular operation to be performed for or on behalf of the adapter function, the particular operation to be selected from a plurality of operations the modify function controls adapter instruction is configured to perform, and wherein the particular operation to be performed in a particular execution of the modify function controls adapter instruction is specified in an operation control provided by a first field of the modify function controls adapter instruction, the first field being separate from the opcode field;
   the first field identifying a location, the contents of which include a function handle identifying a handle of the adapter function, a designation of an address space associated with the adapter function to which the particular operation applies, and the operation control specifying the particular operation to be performed for the adapter function, the operation control specifying one operation of the plurality of operations that can be selected; and
   a second field for identifying an address of a function information block to be used by the modify function controls adapter instruction; and
  executing the machine instruction, the executing comprising:
   determining a value of the operation control; and
   modifying, based on the operation control, a selected table entry that includes parameters associated with the adapter function, wherein the modifying comprises selectively updating one or more parameters of the selected table entry based on the value of the operation control and based on one or more checks that depend on the value of the operation control.

14. The computer system of claim 13, wherein the instruction is issued by an operating system, and wherein the modifying comprises using information in the function information block to modify the one or more parameters, the function information block fetched from memory accessible to the operating system.

15. The computer system of claim 14, wherein the table entry comprises a device table entry located in a hub coupled to the adapter function and the processor or another entry associated with the adapter function.

16. The computer system of claim 14, wherein the operation control comprises registering adapter interruptions for the adapter function, and wherein the modifying comprises modifying one or more parameters specific to adapter interruptions, said one or more parameters comprising an address of an adapter function interruption vector for the adapter, an offset within the adapter interruption vector, an address of an adapter function interruption summary vector, an offset within the adapter interruption summary vector, a summary notification control and a number of interruptions supported by the adapter function.

17. The computer system of claim 14, wherein the operation control comprises registering input/output address translation parameters, and wherein the modifying comprises modifying one or more parameters specific to address translation, said one or more parameters including a base address of the address space, a limit of the address space, a translation pointer that indicates a highest level address translation table to be used, a size of a unit of memory and an address translation format.

18. The computer system of claim 14, wherein the operation control comprises setting adapter function measurement parameters, and wherein the modifying comprises modifying one or more parameters specific to adapter measurement, the one or more parameters comprising a sample count, one or more instruction counts, and one or more direct memory access counts.

19. The computer system of claim 14, wherein the operation comprises a reregister of address translation parameters, and wherein the modifying comprises modifying one or more parameters specific to reregistering address translation, including the one or more parameters, a limit of the address space and an address translation pointer that indicates a highest level address translation table to be used, and wherein the modifying uses the one or more controls to indicate a particular ordering of updates related to reregistering the address translation parameters.

20. The computer program product of claim 1, wherein the operation control is configured to indicate a registering adapter interruptions for the adapter function, registering input/output address translation parameters to be used by a hub coupled to the adapter function, a reregister of address translation parameters, setting adapter function measurement parameters, a reset error state indication, unregistering of adapter interruption, and unregistering of input/output address translation parameters to be used by the hub.

21. The computer system of claim 13, wherein the operation control is configured to indicate a registering adapter interruptions for the adapter function, registering input/output address translation parameters to be used by a hub coupled to the adapter function, a reregister of address translation parameters, setting adapter function measurement parameters, a reset error state indication, unregistering of adapter interruption, and unregistering of input/output address translation parameters to be used by the hub.

* * * * *